(12) United States Patent  (10) Patent No.: US 7,510,340 B2
Laganas et al. (45) Date of Patent: Mar. 31, 2009

(54) OPTICAL ADAPTOR SYSTEM AND METHOD

(75) Inventors: Michael Laganas, Colorado Springs, CO (US); Charles Ronald Musgrove, Woodland Park, CO (US)

(73) Assignee: Nocturnal Devices, LLC, Colorado Springs, CO (US)

( * ) Notice: Subject to any disclaimer, the term of this patent is extended or adjusted under 35 U.S.C. 154(b) by 581 days.

(21) Appl. No.: 11/297,035

(22) Filed: Dec. 7, 2005

(65) Prior Publication Data

US 2007/0127905 A1 Jun. 7, 2007

(51) Int. Cl.
*G03B 17/12* (2006.01)
*G03B 41/00* (2006.01)
*G02F 1/01* (2006.01)

(52) U.S. Cl. ............... 396/530; 396/544; 348/217.1; 348/375; 250/330

(58) Field of Classification Search ............... 396/529, 396/530, 544; 348/217.1, 375; 250/214 VT
See application file for complete search history.

(56) References Cited

U.S. PATENT DOCUMENTS

| | | | |
|---|---|---|---|
| 4,961,278 A | 10/1990 | Johnson et al. | |
| 5,053,794 A * | 10/1991 | Benz | ............................ 396/432 |
| 5,444,507 A | 8/1995 | Palmer | |
| 5,828,166 A | 10/1998 | Roselli et al. | |
| 5,909,309 A | 6/1999 | Di Taranto et al. | |
| 5,937,562 A | 8/1999 | Brough | |
| 6,246,049 B1 | 6/2001 | Wirthlin | |
| 6,286,963 B1 * | 9/2001 | Nelson | ........................ 359/506 |
| 6,333,512 B1 | 12/2001 | Wirthlin | |
| 6,449,419 B1 | 9/2002 | Brough et al. | |
| 6,872,933 B2 | 3/2005 | Wirthlin | |
| 2005/0062873 A1 | 3/2005 | Brough | |

OTHER PUBLICATIONS

Electrophysics Corp., Night Vision, Jul. 21, 2005, http://www.electrophysics.com/night-vision/, p. 1-8.
Electrophysics Corp., AstroScope 9350 BRAC, Jul. 21, 2005, http://www.electrophysics.com/Browse/Brw_ProductLineCategory.asp?CategoryID=152&Area=NV, p. 1-4.

* cited by examiner

*Primary Examiner*—W. B. Perkey
(74) *Attorney, Agent, or Firm*—Kenyon & Kenyon LLP

(57) ABSTRACT

System and method for modifying an optical assembly with another image modifying device by using an adapter assembly to connect or couple three image modifying devices together. The adapter assembly includes two adapters that have collars to hold a night vision monocular between them, and to each connect with a camera and lens, respectively, modifying a camera-lens assembly for use in night time photo surveillance. One adapter's collar includes a gripping mechanism to grip one end of the night vision monocular. The other adapter's collar includes one or two channels to each receive a pin on the other end of the night vision monocular and a locking mechanism to secure one pin in its channel. Attachments members on each adapter include mechanical and electrical connectors to couple or connect the adapters to each other, and to electrically connect the camera with the lens.

60 Claims, 20 Drawing Sheets

OPTICAL ADAPTOR SYSTEM AND METHOD

FIELD OF INVENTION

This invention relates to an optical adapter system and method, and more particularly to an easily assembled adapter system, for example, for modifying a standard assembly with an otherwise incompatible image modifying device in order to readily increase the functionality of the existing optical assembly in different lighting or atmospheric conditions.

BACKGROUND

Standard optical assemblies, e.g., firearm day scopes, camera-telephoto lens assemblies, and day-time monoculars, may need to be readily modifiable upon a change in lighting or atmospheric conditions, without going through the expense and burden of creating and carrying around a variety of custom-made optical assemblies for each type of condition. This is especially true for military operations that may take place in darkened harsh climates, e.g., where humidity or wind-strewn sand or other fine particles threatens to damage or wear any equipment, and where any excessive sound may inadvertently reveal the position of our military forces and put their lives further at risk.

Existing adapters designed to facilitate the connection of a second image modifying device to a standard optical assembly (e.g., connecting a night vision monocular to a camera) fail to address the above concerns. For example, existing adapters:

(1) have limited applications (e.g., are only operational with a subset of the optical assemblies carried around by most servicemen and women);

(2) are too complex and noisy to be quickly, quietly and securely assembled in the dark (e.g., requiring the user to carry and use Allen wrenches or other tools in the assembly or disassembly, lacking discernable labels or markings, and requiring the user to loudly snap a metal buckle onto the outer surface of the adapter in order to secure an image modifying device to the adapter);

(3) are not manufactured consistently (e.g., sometimes requiring additional components to be added in order to adjust an error in the focal length between lenses);

(4) are made with metals and other materials that erode, deform or rust after continual usage in harsher climates;

(5) unduly expose delicate components in the adapter and in the image modifying devices, e.g., wiring and pin connectors, to the elements during use or assembly; and/or (6) are more expensive to manufacture by including the manufacture and inclusion of such delicate components in the adapters.

SUMMARY

The present invention provides adapter assemblies that are more flexible, simple, quiet, secure, reliable, sturdy, protective, and less expensive than the existing adapters. The invention may include an adapter assembly of two adapters to securely but releasably connect or couple three image modifying devices together. The middle device (also referred to as the second image modifying device) may be a night vision monocular that, without the adapter assembly, could not be coupled to two other image modifying devices compatible with each other, such as a camera and telephoto lens. The middle device is securely but releasably coupled or connected between the two adapters.

Each adapter includes a collar, the inner portion of which receives and securely holds a portion of the middle device therein. The outer portion of each collar is coupled with one of the other image modifying devices (also referred to as the first and third image modifying devices). Each adapter also includes an attachment member attached to or integrally formed with the collar that couples or connects the two adapters to each other. The attachment member of one adapter has a female electric connector and dowels that mate with or connect or couple with a male electric connector and holes or cavities in the attachment member of the other adapter.

The mechanisms or configuration used to assemble the devices with the adapters are quieter and securely releasable. There are no snapping buckles and there are no surfaces (metal or plastic) that loudly strike against other surfaces during assembly or disassembly. Thus, the system and method does not produce excessive noise that may jeopardize the safety and reveal the location of our servicemen during combat or similar situations.

The middle device is held on either end by the inner portion of the collar on each adapter. One collar may include one or more channels and a locking mechanism. The channels slidably receive mating members (such as pins or dowels or posts on an outer surface of the middle image modifying device), and the locking mechanism secures the position of the mating member in the channel. The locking mechanism may be a screw that extends through an opening into the top channel, and that when inserted, blocks movement of the mating member back out of the channel. The other collar may include a gripping mechanism to hold onto the other end of the middle imaging device. The gripping mechanism may include a screw running through an opening in the collar, that when further inserted, presses down on the middle device, and may press an outer surface of the middle device against an inner surface of the collar. The mechanisms and configurations of how each collar holds the middle device are interchangeable or one of the above-described mechanisms and configurations may be used on both collars to retain and hold the middle imaging device between them.

Each attachment member may also include electric wiring contained therein that are connected on one end to the electric connectors in the attachment member, and at the other end to electric interfaces or connectors in the collar of each adapter. The electric wiring and interface allow a front image modifying device (also referred to as a first image modifying device) to be electrically connected to the back image modifying device (also referred to as a third image modifying device), while electrically isolating the middle or second image modifying device. If the camera is the first image modifying device, a night vision minimonocular is the middle image modifying device, and a telephoto lens is the third image modifying device, then the camera may still be electrically connected to the telephoto lens, while the minimonocular may be electrically isolated from the two (and operating with its own battery or other independent power source). Each collar may also include engraved or printed markings either with fluorescent, phosphorescent, reflective or other illuminable materials or ink (whether illuminated independently or by a power source) to allow the three devices and adapters to be easily assembled in a darkened or less clear environment.

At least part of the adapter assembly may be made of a hardened plastic material, such as Delrin®, or other acetal homopolymers, that, unlike metal, does not corrode, deform or rust, and is easily and accurately molded or machined by automated manufacturing systems in high volume. Additionally, one or more of the devices and/or the adapters may be painted with a camouflage print or style for desert and/or jungle conditions, to further conceal and provide additional coverage for servicemen using this equipment during combat and other similar conditions.

In an example embodiment, an adapter system includes a first adapter configured to couple a first image modifying device, e.g., a lens, with a second image modifying device, e.g., a night vision monocular. The proximal portion of the first adapter is configured to be connected to the first image modifying device. The distal portion of the first adapter is configured to be connected to the second image modifying device. The distal portion includes a first channel and a locking mechanism. The first channel is configured to receive a first mating member on the second image modifying device. The locking mechanism is selectively engageable to releasably secure a position of the first mating member in the first channel.

In an example embodiment, an adapter system includes a first adapter configured to couple a first image modifying device with a second image modifying device. A distal portion of the first adapter is configured to be connected to the first image modifying device. A proximal portion of the first adapter is configured to be connected to the second image modifying device. The proximal portion includes a locking mechanism. The locking mechanism includes a threaded opening through a periphery of the proximal portion and a screw. The screw is long enough to extend through the opening and to push an outer surface of the distal portion of the second image modifying device against an inner surface of the proximal portion of the first adapter when the screw is further inserted through the opening.

In an example embodiment, the first image modifying device is connected to the proximal portion of a first adapter. A first mating member on the proximal portion of the second image modifying device is inserted into a first channel in a distal portion of the first adapter. After the insertion step, a position of the first mating member on the second image modifying device is secured in the first channel.

In an example embodiment, the first image modifying device is connected to the distal portion of the first adapter. A screw on the proximal portion of the first adapter is rotated through an opening through a periphery of the proximal portion of the first adapter until a lower end of the screw presses against an upper portion of the outer surface of the distal portion of the second image modifying device.

DETAILED DESCRIPTION

The present invention relates to an optical adapter system and method. FIGS. 1 through 20 illustrate various aspects of the optical adapter system and method according to the present invention.

Figure 1:
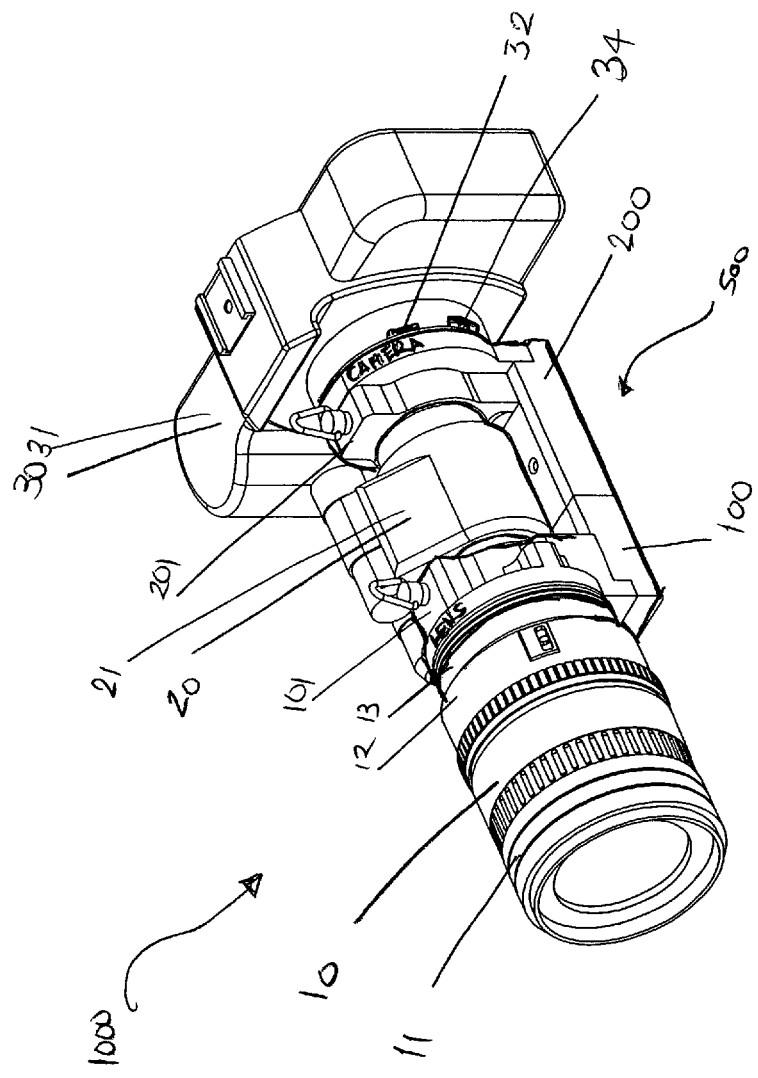
FIG. 1 illustrates a perspective view of an embodiment of an optical adapter system and method according to the present invention.
Figure 2:
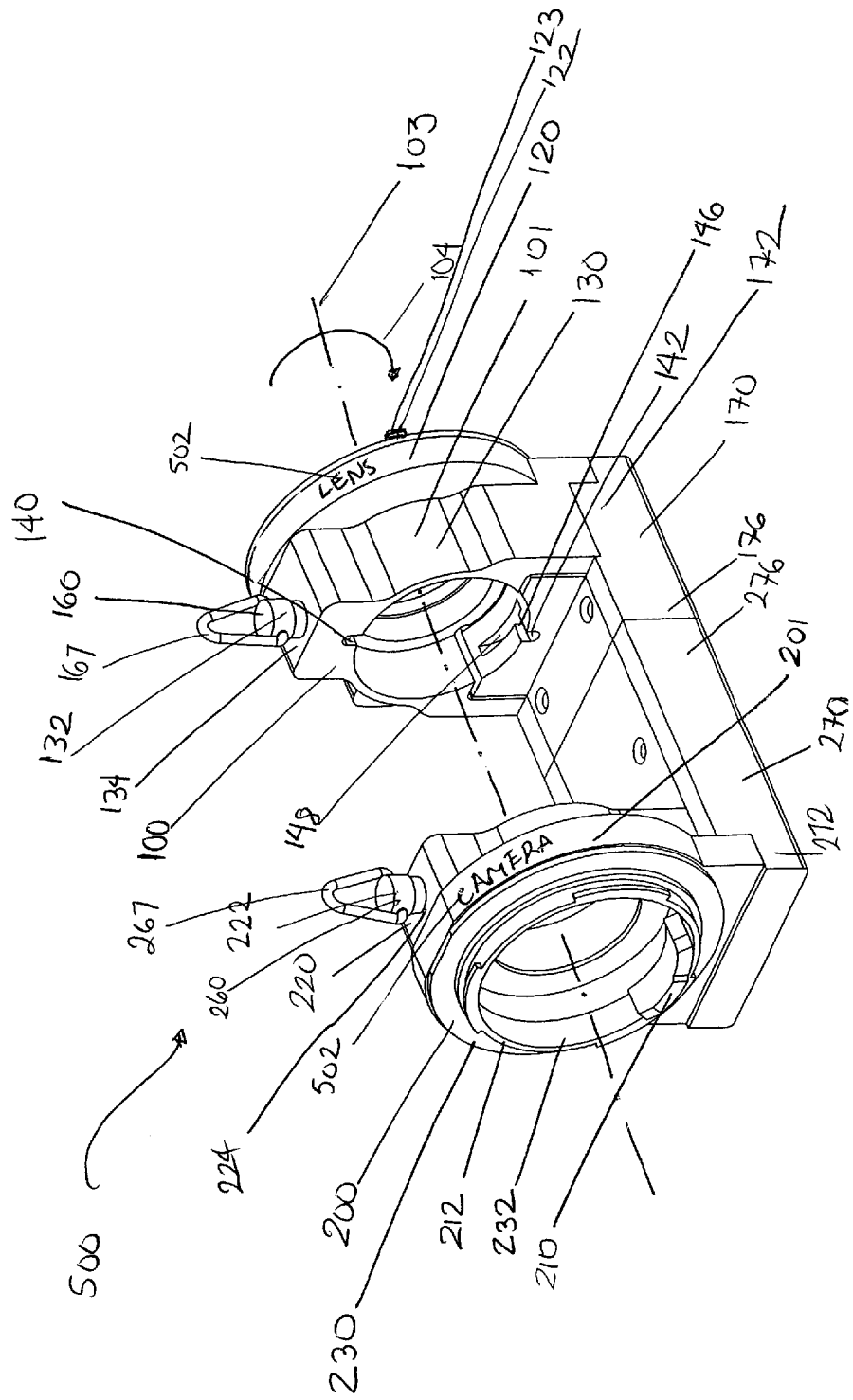
FIG. 2 illustrates a perspective view of a first and second adapters in the embodiment of the optical adapter system and method of FIG. 1.

As illustrated in FIGS. 1 and 2, the optical adapter system 1000 includes an adapter assembly 500 to releasably connect image modifying devices 10, 20 and 30 to each other. One or more of the image modifying devices 10, 20, and 30 may be part of a standard optical assembly. For example, as illustrated in FIG. 1, the first and third image modifying devices 10 and 30 may be part of a standard lens 11 camera 31 assembly that are configured to be directly connected or coupled with each other. The second image modifying device 20 may be a night vision monocular 21, part of a standard night vision optical assembly, that without the adapter assembly 500, could not be otherwise connected, coupled or functional with the camera-lens assembly.

The term "image modifying device" is used herein in a more expansive, rather than a limited sense, and encompasses any device or assembly or component or portion thereof that processes any visual image information, including by generating, capturing, altering, transmitting, rendering, recording, storing, playing back, encoding or decoding originally live images or digitally created images, either alone, or with additional types of information, e.g., sound or other sensory-related information. For example, "image modifying devices" may refer to analog or digital cameras, telephoto lenses and other types of lenses and filters, night vision monoculars, eyepieces, fiber optic viewers, camcorders, digital or analog video cameras, visual image processors, display screens, monitors, rifle or gun scopes, spotting scopes, telescopes, binoculars, laser rangefinders, bow sights, mortar sights, anti-tank sights, anti-aircraft sights, infared cameras, image pickup devices, gyro stabilized and digitally stabilized optics, film-type cameras, devices that transform an image into electrical signals such as still or video cameras of the digital or analog type, image recording devices, image pick-up heads, or flying spot scanners, or any component or portion or accessory to any of the foregoing.

Image modifying devices may alter visual information, e.g., by changing the brightness, intensity, magnification, color and/or filed of view of an image. Image modifying devices may include image intensifying or generating technologies such as night vision, infrared, thermal imaging, and/or sonar, ultrasound, electrical and radio imaging technologies. Optical assemblies of first and third image modifying devices 10 and 30, may be standard optical assemblies that are available off-the-shelf, e.g., camera-telephoto lens assemblies, monocular-telephoto lens assemblies, and/or rifle or gun scopes. Such optical assemblies may not be directly compatible or operational with a second image modifying device 20, without the use of adapter assembly 500.

The adapter assembly 500, as illustrated in FIGS. 1 through 4, includes first adapter 100 and second adapter 200. The first adapter 100 is configured to connect the first image modifying device 10 to the second image modifying device 20. The second adapter 200 is configured to connect the second image modifying device 20 to the third image modifying device 30. Although each adapter is described below with a particular configuration for releasably but securely connecting or coupling with the image modifying devices and with each other, the connecting or coupling configurations are interchangeable between each of the adapters, as are the image modifying devices. At least a portion or all of adapters 100 and 200 may be made from a hardened plastic substance, such as Delrin®, an acetal homopolymer made by DuPont Corporation. Such material can be readily manufactured, and is not subject to the same deformation and rust and wear and tear of metal components. "CAMERA" and "LENS" markings 502 (as well as other markings) on adapter assembly may be visually enhanced by being engraved with fluorescent or phosphorescent materials or otherwise illuminable from an electrical source in adapters 100 and/or 200, or from an electrical connection to the first or third image modifying devices 10 and 30. Additionally parts of the assembly may be painted with camouflage cover to provide additional cover for the user.

As illustrated in FIGS. 2 through 7, and FIGS. 10, and 12 through 15, the first adapter 100 includes a collar 101 having a proximal portion 120 and a distal portion 130, and an attachment member 170 attached to the distal portion 130 (attachment member 170 also being regarded as part of the distal portion 130 and may be integrally formed as part of collar 101 or a separate piece attached to collar 101).

The illustrated collar 101 is closed when attached to attachment member 170, but the collar 101 may also be open, or more of a casing or housing in other embodiments. Proximal portion 120 is configured with a mechanism 122 to mechanically connect or couple the first adapter 100 to the lens 11, and an electric connector 110 to electrically connect or couple the first adapter 100 to the lens 11. Mechanism 122 as illustrated, inter alia, in FIG. 6, includes a twist and lock mechanism 123 configured to be releasably but securely connected or coupled with the matching interface 13 on the distal portion 12 of the lens 11. Electrical connector 110 may include depressible pins 112, as illustrated, that are securely attached within collar 101. Mechanism 122 and connector 110 may be similar or the same as the mechanism 32 (or match the manner in which mechanism 32) on camera 33, illustrated in FIG. 1, that enables the camera 33 to be directly mechanically and electrically connected or coupled with the lens 11. In the case of the camera 33 and lens 11 being standard off-the-shelf designs, the mechanism 122 and connector 110 may have a standard configuration to couple or connect a variety of lenses 11 with a variety of other image modifying devices 200 and 300 in optical adapter systems 1000.

Figure 7:
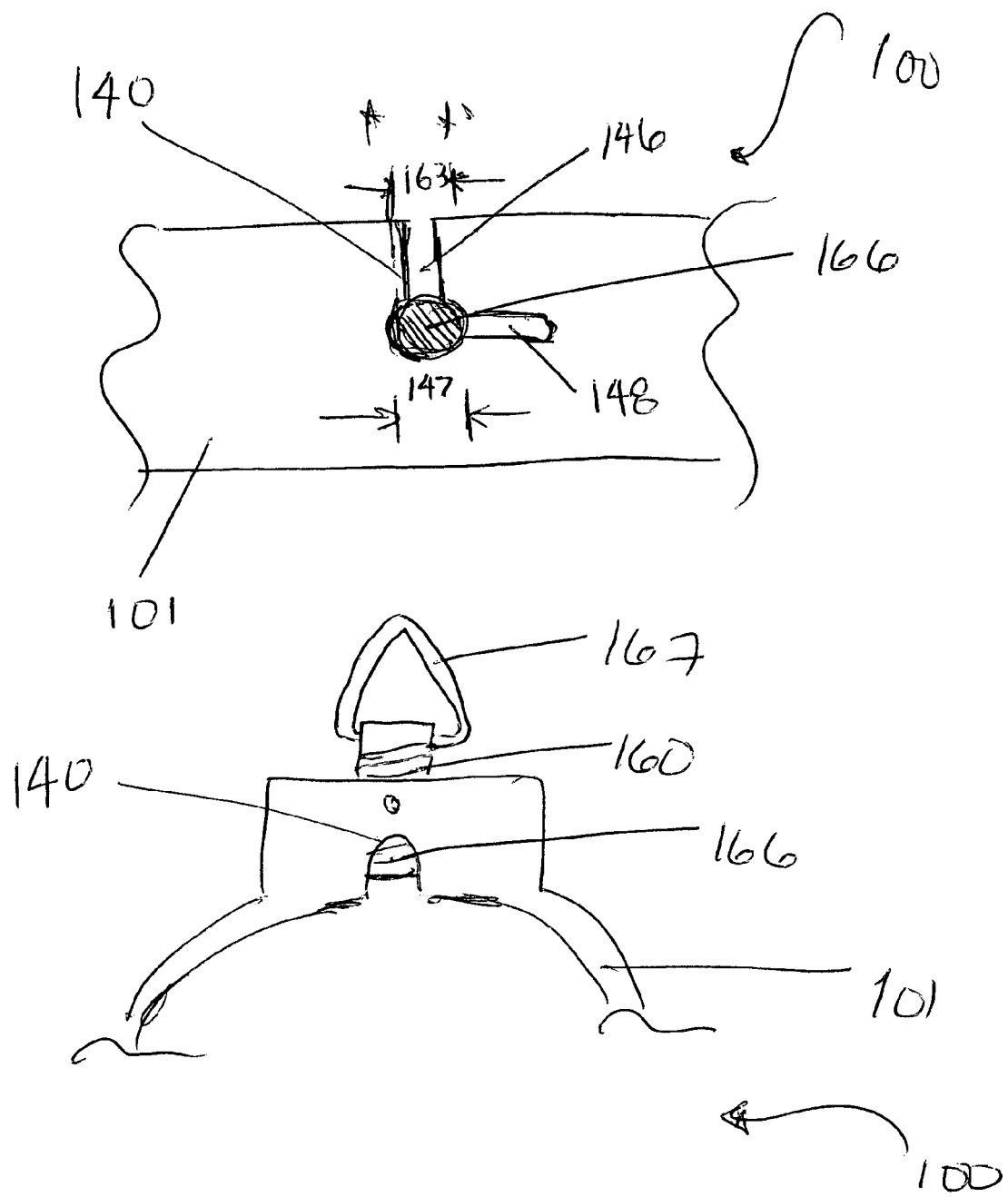
FIG. 7 illustrates partial underside and side views of the top portion of the first adapter in the embodiment of the optical adapter system and method of FIG. 1.

The distal portion 130 of the collar 101 is configured to receive the proximal portion 22 of the night vision monocular 21, as illustrated in FIGS. 2 through 7, and FIGS. 10, and 12 through 15. The distal portion 130 includes a locking mechanism 132 and two channels 140 and 142 to securely but releasably couple or connect the distal portion 130 of first adapter 100 with the proximal portion 22 of the night vision monocular 21 (sometimes referred to as a "monoloc"). Each channel 140, 142 is configured to receive a mating member 25, 28 on the proximal portion 22 of night vision monocular 21. Locking mechanism 132 is designed to secure a position of upper mating member 25 in upper channel 140, or, in other words, at least partially obstruct or prevent movement of mating member 25 out of channel 140. Mating member 25 may have some freedom of movement within upper channel 140, e.g., within portion 148 of channel 140 as illustrated in FIG. 7, when the position of the mating member 25 is secured by locking mechanism 132, provided that mating member 25 is not readily removable from the upper channel 140 once locking mechanism 132 is engaged in upper channel 140. Additionally, securing a position of mating member 25 in channel 140 may include sufficiently securing the focal length between lenses in the first image modifying device 10 and the second image modifying devices 20, so that the two image modifying devices may be usable together.

Figure 10:
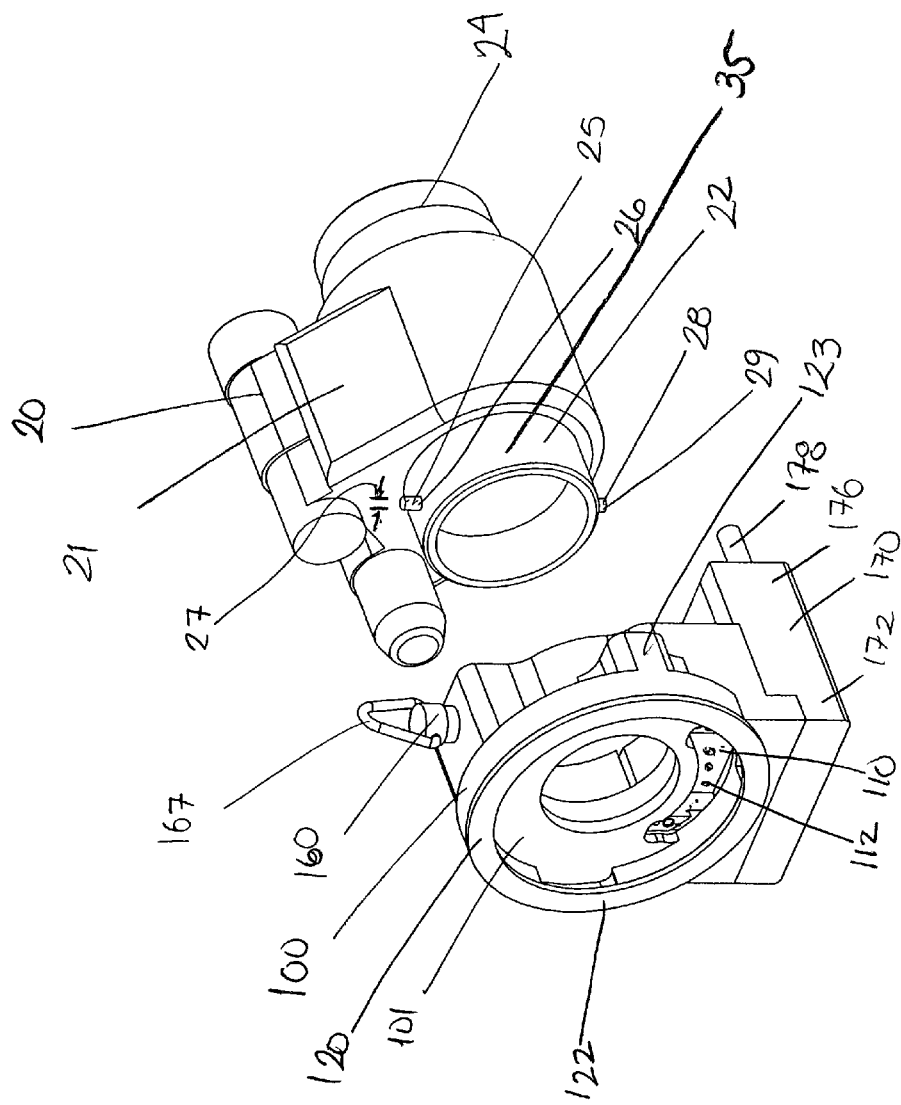
FIG. 10 illustrates a perspective view of a first adapter and a night vision monocular in the embodiment of the optical adapter system and method of FIG. 1.
Figure 11:
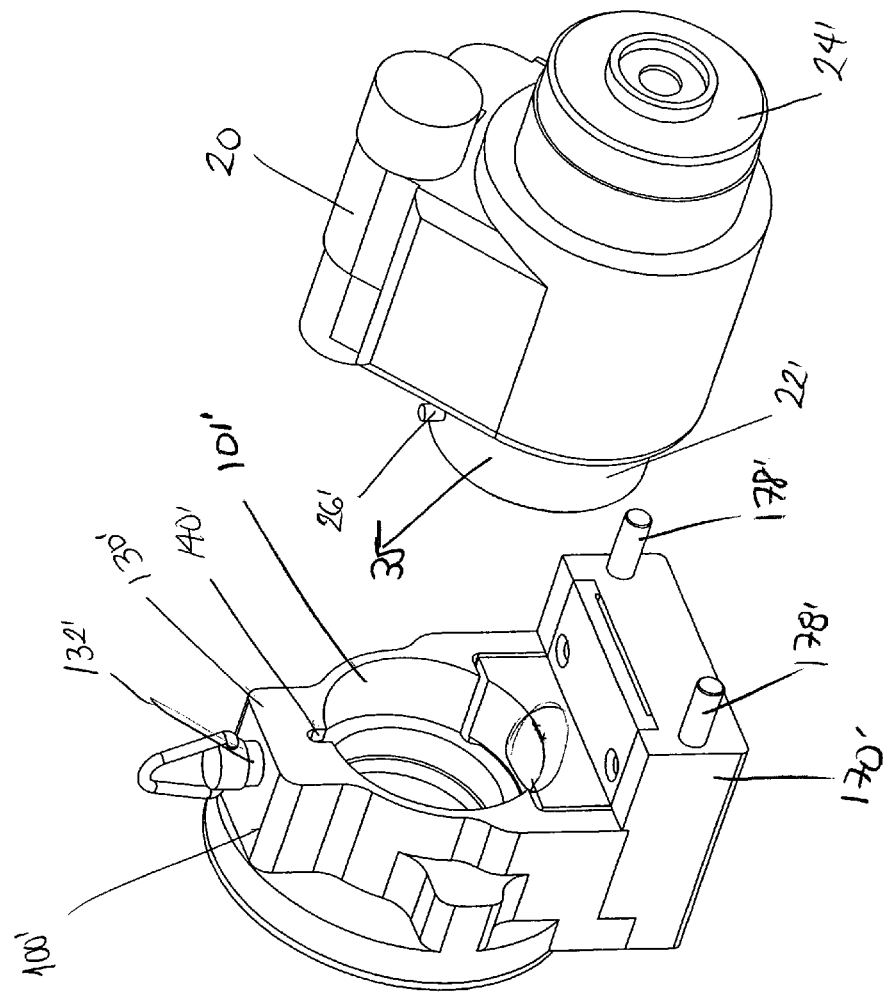
FIG. 11 illustrates a perspective view of a first adapter and a night vision monocular in an embodiment of an optical adapter system and method according to the present invention.
Figure 12:
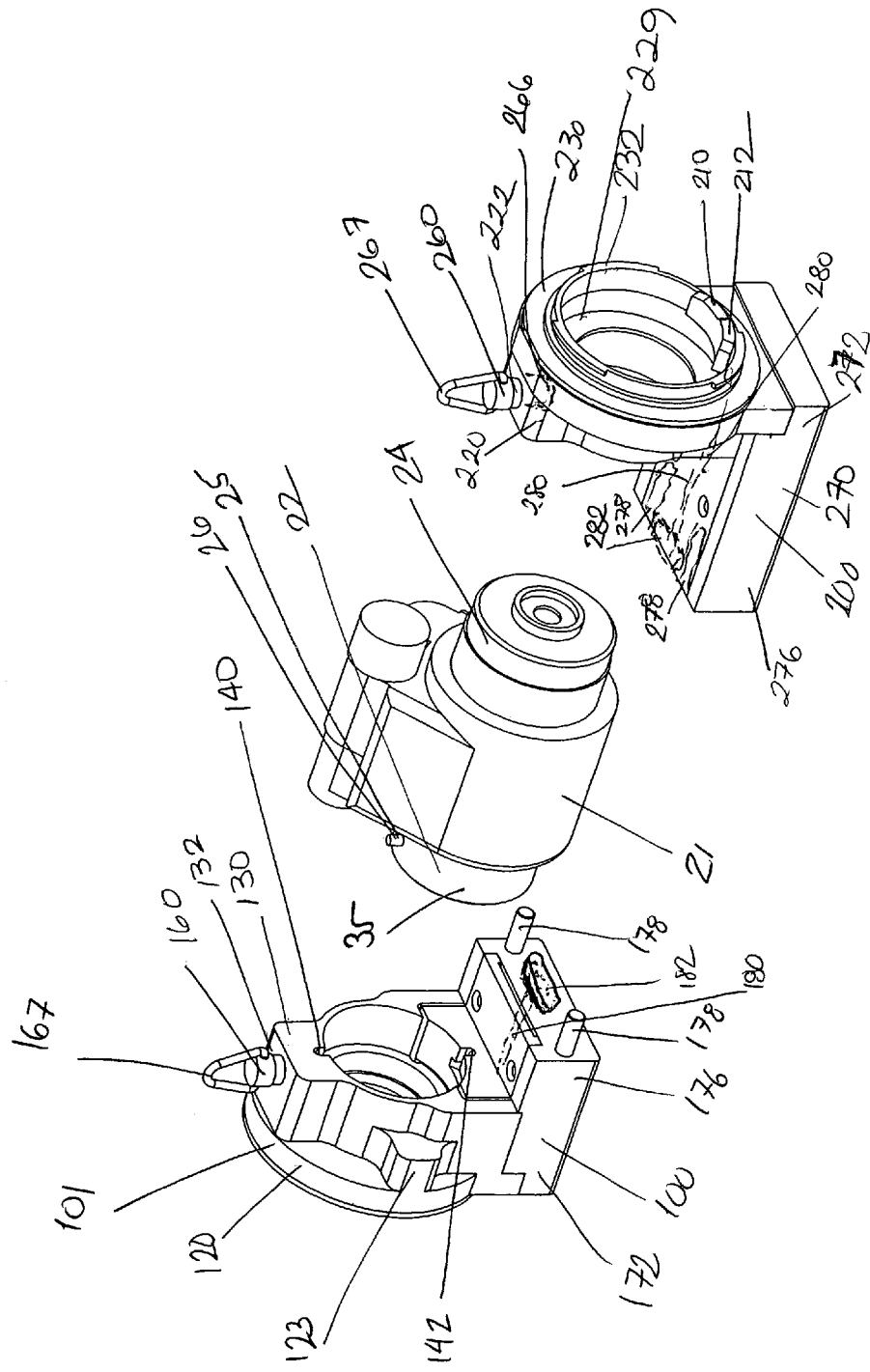
FIG. 12 illustrates a perspective view of the first adapter, the night vision monocular, and the second adapter in the embodiment of the optical adapter system and method of FIG. 1.
Figure 13:
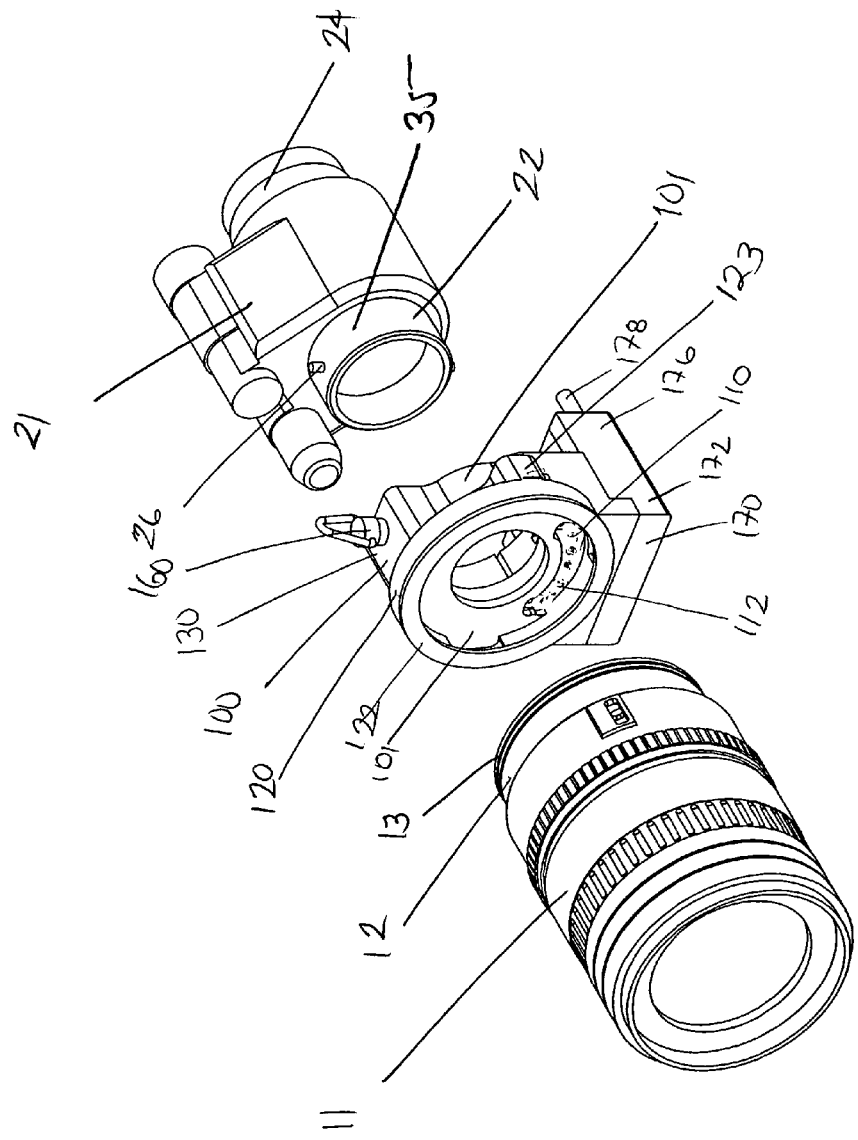
FIG. 13 illustrates a perspective view of a lens, the first adapter, and the night vision monocular in the embodiment of the optical adapter system and method of FIG. 1.
Figure 14:
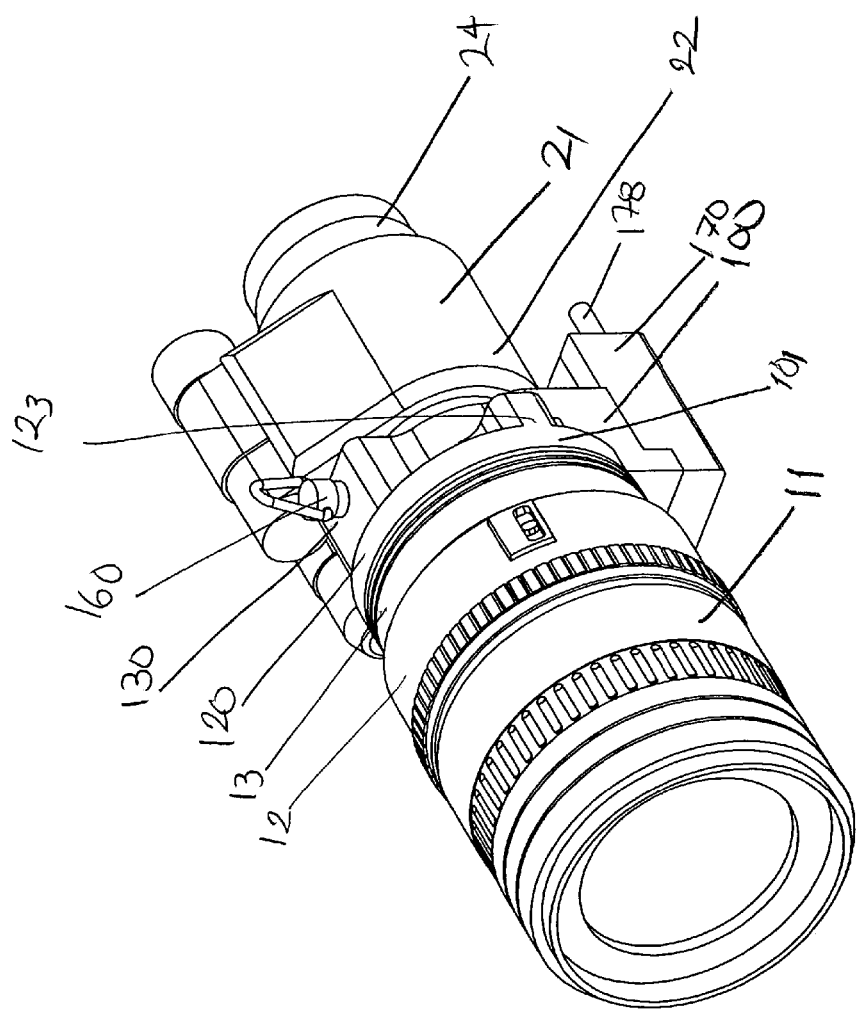
FIG. 14 illustrates a perspective view of an assembly of the lens, the first adapter and the night vision monocular of FIG. 13.
Figure 15:
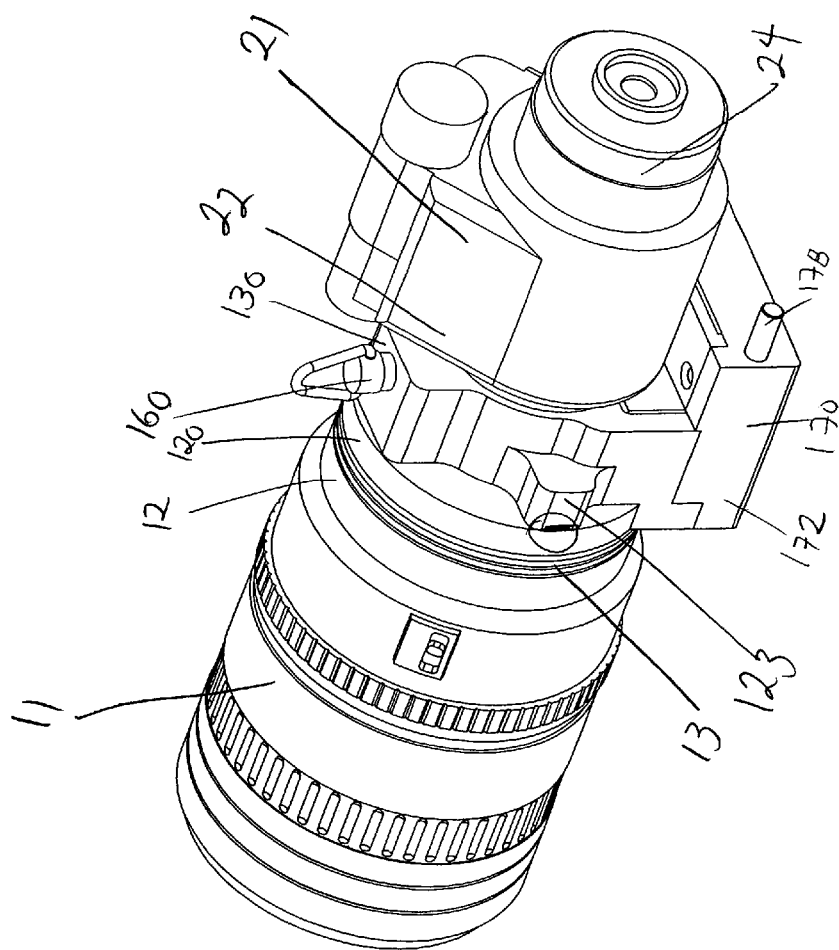
FIG. 15 illustrates a perspective view of an assembly of the lens, the first adapter and the night vision monocular of FIG. 13.

Mating members 25 and 28, of night vision monocular 21 or any other second image modifying device 20, extend from an outer surface thereof and may be cylindrical hollow or solid posts or pins 26 and 29, as illustrated in FIGS. 10, 12 and 13. Each of pins 26 and 29 has a diameter 27 less than a width 144 of each respective channel 140 and 142, so that pins 26 and 29 may be free to move through channels 140 and 142 as the proximal portion 22 of night vision monocular 21 is inserted into the distal portion 130 of collar 101. Pins 26 and 29 may be diametrically opposite from each other, as illustrated, as well as corresponding channels 140 and 142 that receive pins 26 and 29.

Figure 3:
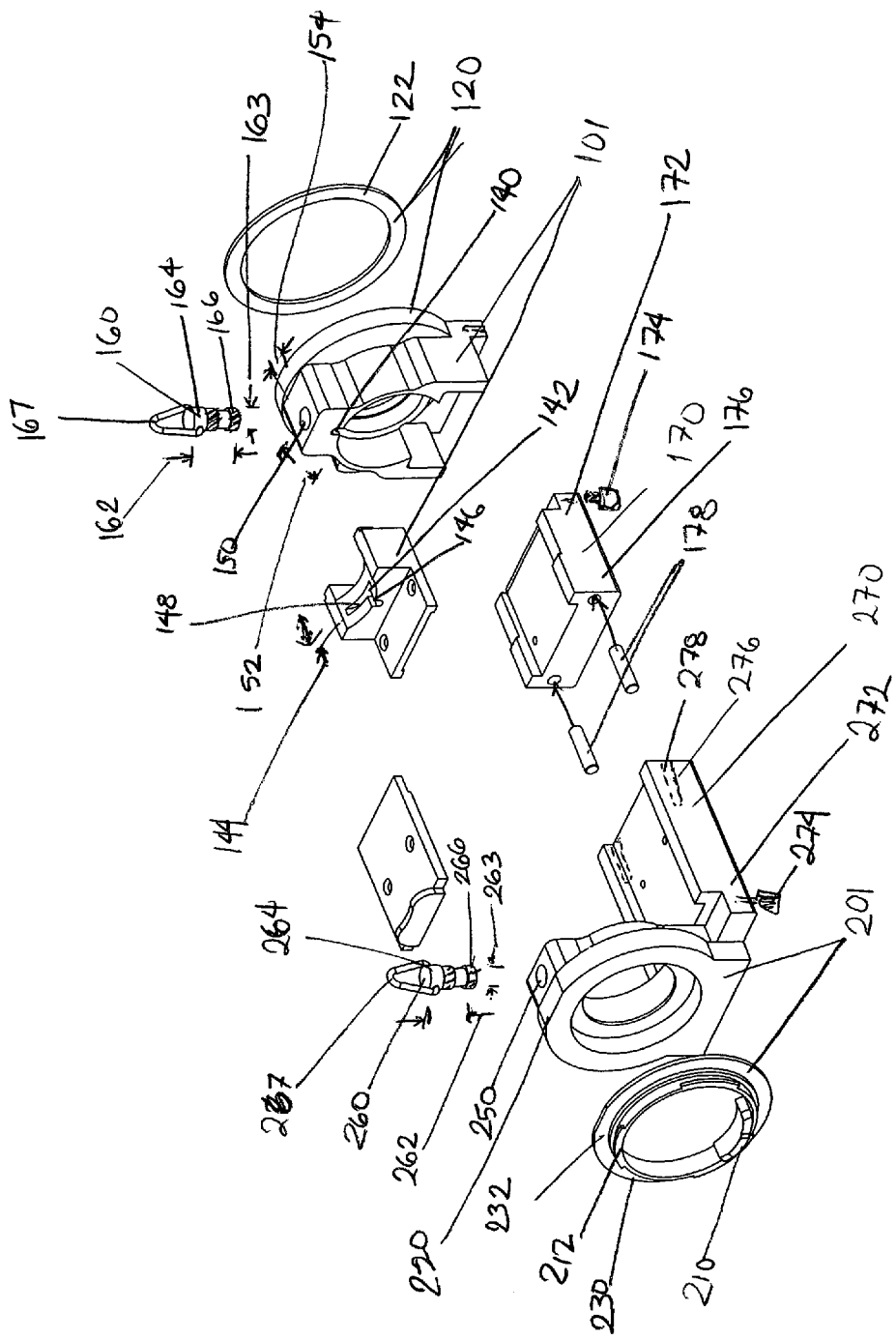
FIG. 3 illustrates an exploded view of the first and second adapters in the embodiment of the optical adapter system and method of FIG. 1.
Figure 4:
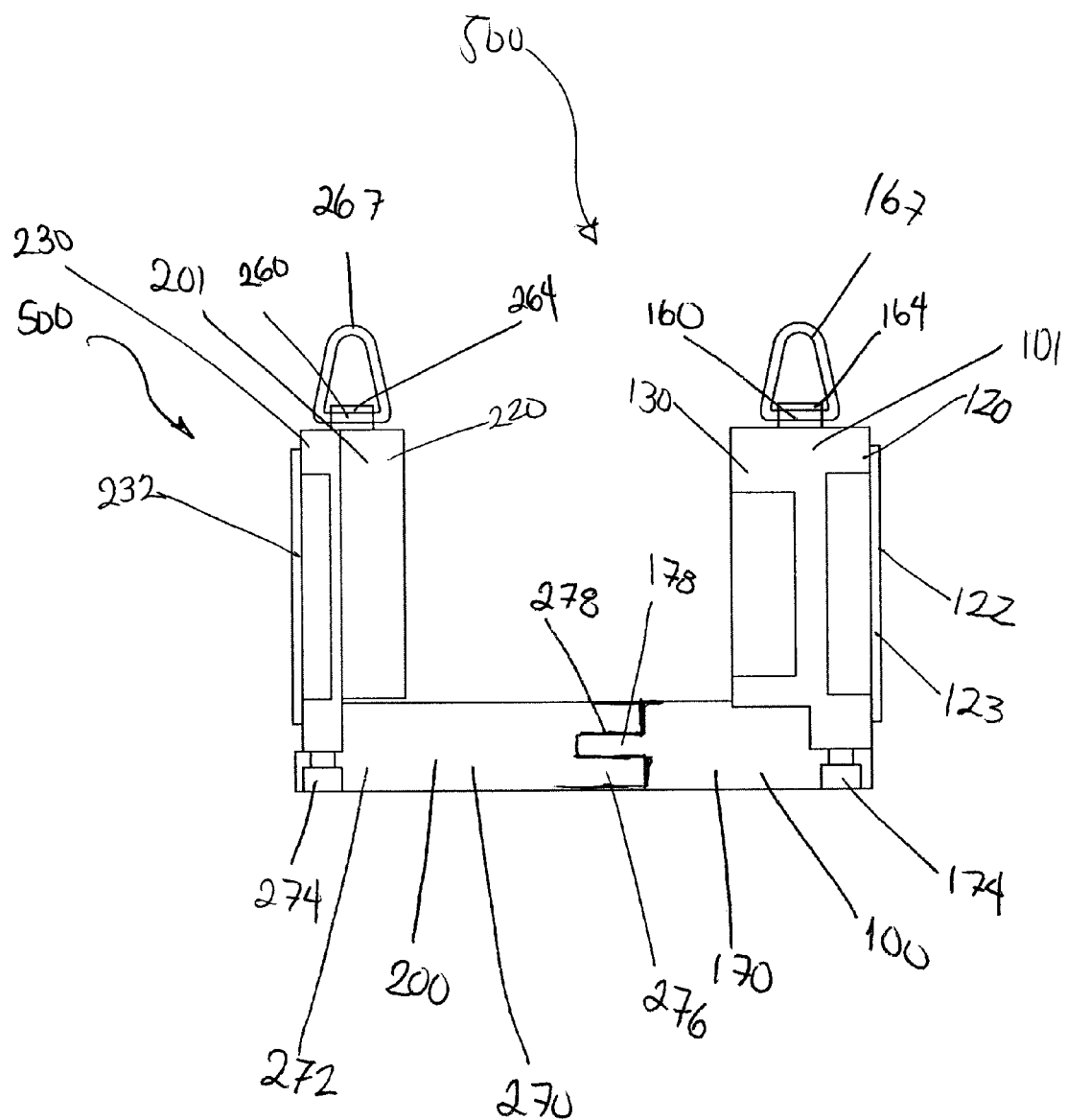
FIG. 4 illustrates a side view of the first and second adapters in the embodiment of the optical adapter system and method of FIG. 1.
Figure 5:
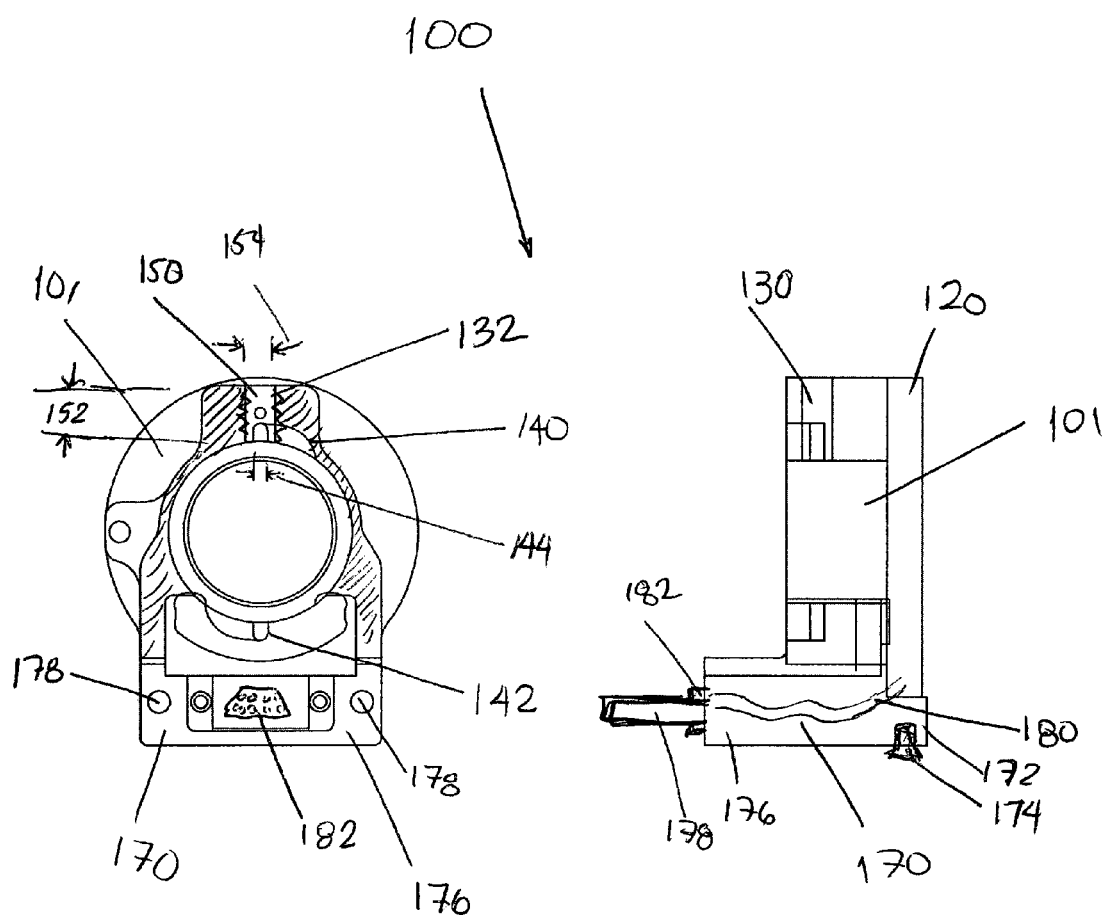
FIG. 5 illustrates a cross sectional inner view and a side view of a collar and an attachment member in the first adapter in the embodiment of the optical adapter system and method of FIG. 1.
Figure 6:
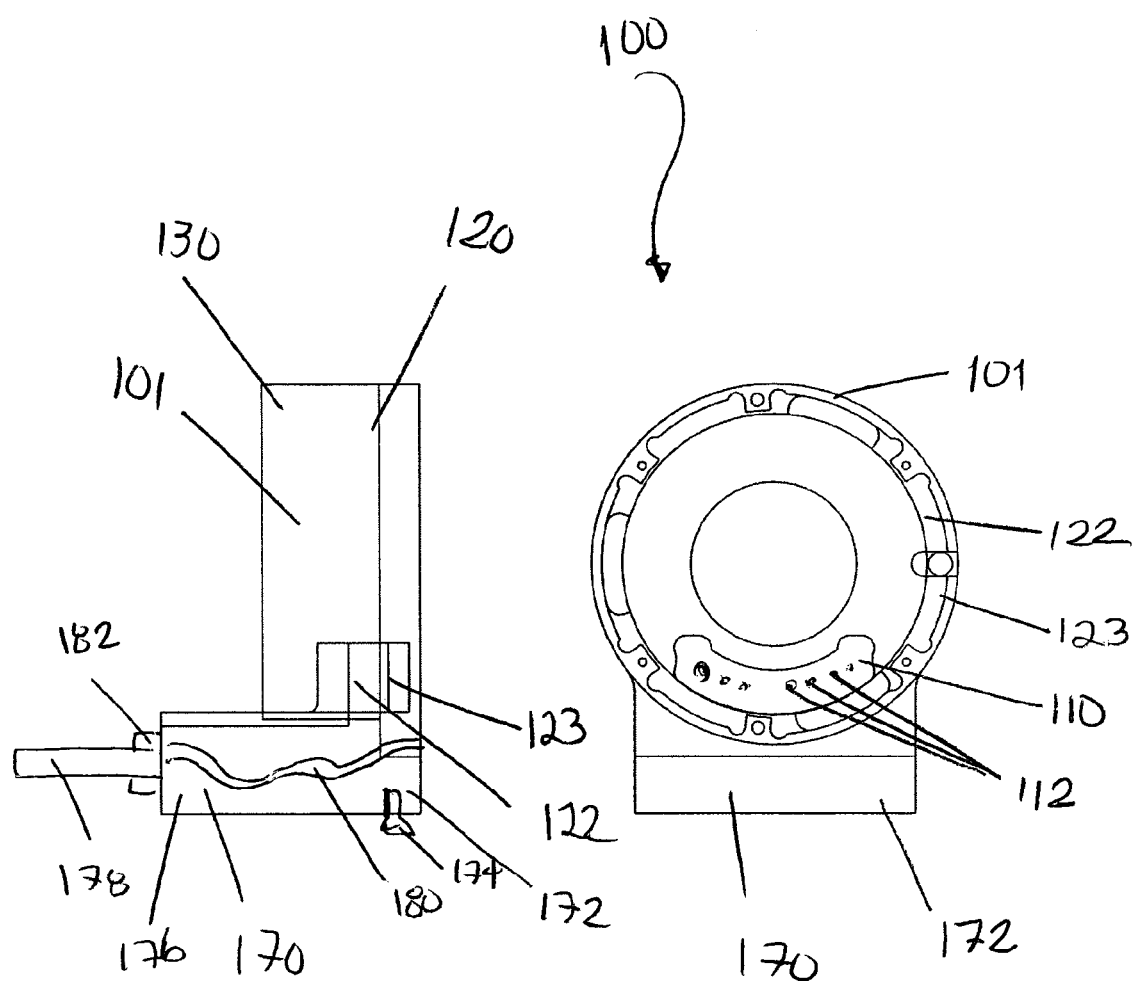
FIG. 6 illustrates outer and side views of the collar and attachment member in the first adapter in the embodiment of the optical adapter system and method of FIG. 1.

Locking mechanism 132 includes an opening 150 through a surface or periphery 134 in the distal portion 130 of collar 101, and a screw 160 configured to be threadably receivable therethrough, as illustrated in FIGS. 3, 5 and 7. Opening 150 is at least partially threaded and runs through a cross section of surface or periphery 134 into upper channel 140. Screw 160 may have a ring or member, such as d-ring 167 on top 164, to make it easier to manually rotate screw 160 in clockwise and counterclockwise directions. Additionally, d-ring 167 on first adapter 100, either alone or together with d-ring 267 on second adapter 200, allow adapter assembly 500 or the entire optical adapter assembly 1000 to be securely threaded and tied onto or around other gear or equipment (not shown), making the assembly 1000 or any portion thereof easier to carry around.

Screw 160 has a length 162 sufficient to extend through a length 152 of opening 150 to at least partially block a portion of channels 140 and 142 when screw 160 is further inserted through opening 150. Thus, screw 160 is longer than the length 152 of opening 150, and has a diameter 163 less than a diameter 154 of opening 150 to be threadably inserted therethrough. Screw 160 also has diameter 163 less a width 147 in channel 140, so that bottom portion 166 of screw 160 can be received in and obstruct channel 140 as illustrated in FIG. 7, and secure a position of mating member 25 of night vision monocular 21 therein.

Each channel 140, 142 runs a path that allows mating members 25 and 28 to be securely but releasably inserted therein as the proximal portion 22 of night vision monocular 21 is inserted into distal portion 130 of collar 101. As illustrated in FIGS. 2, 3 and 7, first portion 146 of channels 140 and 142 is parallel to the direction in which the night vision monocular 21 is inserted into the collar 101, and is also parallel to a longitudinal axis 103 of collar 101. Second portion 148 of channels 140 and 142 are perpendicular to first portion 146, and are also parallel to the direction of rotation 103 of night vision monocular 21 in collar 101.

Essentially, in order to secure night vision monocular 21 in collar 101, as illustrated in FIGS. 2, 7, 10, 12 and 14, the proximal portion 22 of night vision monocular 21 is inserted into distal portion 130 of collar 101, sliding pins 26 and 29 through the first portions 146 of channels 140 and 142. The proximal portion 22 of night vision monocular 21 is then rotated inside distal portion 130 of collar 101, sliding pins 26 and 29 through second portions 148 of channels 140 and 142. Finally, in order to secure the night vision monocular 21 in collar 101, locking mechanism 132 is activated or engaged to secure a position of pin 26 in second portion 148 of channel 140 by further screwing or inserting screw 160 through opening 150, until the bottom 166 protrudes into or obstructs channel 140. Night vision monocular 21 can be removed from collar 101 by unscrewing or removing screw 160 upwards through opening, until the bottom 166 clears or no longer obstructs channel 140. The night vision monocular 21 is then rotated and removed to move pins through the second portion 148 and then the first portion 146 of channels 140 and 142.

The channels are illustrated opposite each other as upper and bottom channels 140 and 142. However, many alternative embodiments are possible. For example, channels may be located anywhere on the interior of the distal portion 130 of the collar and have a different path of insertion. Either or both channels may have a locking mechanism. The locking mechanism 132 may be a ball bearing or lip located in an interior of each channel 140 and 142.

Alternatively, the distal portion 130 of the collar 101 may be designed and function with only one channel, and one locking mechanism, and second image modifying device may have only one mating member or pin. As illustrated in FIG. 10, first adapter 100' includes one channel 140' configured to slidably receive pin 26' on second image modifying device 20'. Locking mechanism 132' is configured to secure a position of pin 26' within distal portion 130' of collar 101.'

As illustrated in FIGS. 3 through 6, 8 through 10, and FIGS. 12 and 13, the first adapter 100 includes an attachment member 170 for releasably connecting or coupling first adapter 100 with second adapter 200. Attachment member 170 may be integrally formed with collar 101 or removably attached to collar 101 with screws 174 in proximal portion 172 of attachment member 170. Attachment member 170 includes two means for connecting first adapter 100 to second adapter 200, one mechanical and one that is both electrical and mechanical. First, attachment member 170 includes two dowels 178 in distal end 176 configured to be inserted in corresponding holes in proximal end 276 of attachment member 270 of second adapter 200. Attachment member 170 has female connector 182 at distal end 176 to interface and connect with male connector 282 in proximal end 276 of attachment member 270 of second adapter 200. Attachment member 170 further includes circuitry 180 therein that is connected with female connector 182, and attachment member 270 includes circuitry 280 therein that is connected with male connector 282. Electrical circuitry 180, 280 and female and male connectors 182 and 282, together with electrical connectors 110 and 210 allow lens 11 to be electrically connected to camera 31 through adapter assembly 500, when fully assembled, while electrically isolating the night vision monocular 21 from both lens 11 and camera 31. In alternative embodiments, there may be any number of dowels or posts or pins to attach the first adapter to the second adapter, and the dowels or posts or pins may be included on one or both of the first and second adapters 100 and 200, with corresponding cavities or hopes or openings on either side. Additionally, the female and male electrical connectors 182 and 282 are interchangeable, and may be on either first or second adapter 100 and 200.

As illustrated in FIGS. 2 through 4, and FIGS. 8, 9 and 12, the second adapter 200 includes a collar 201 having a proximal portion 220 and a distal portion 230, and an attachment member 270 attached to the distal portion 230 (attachment member 270 also being regarded as part of the distal portion 230 and may be integrally formed as part of collar 201 or a separate piece attached to collar 201).

Figure 9:
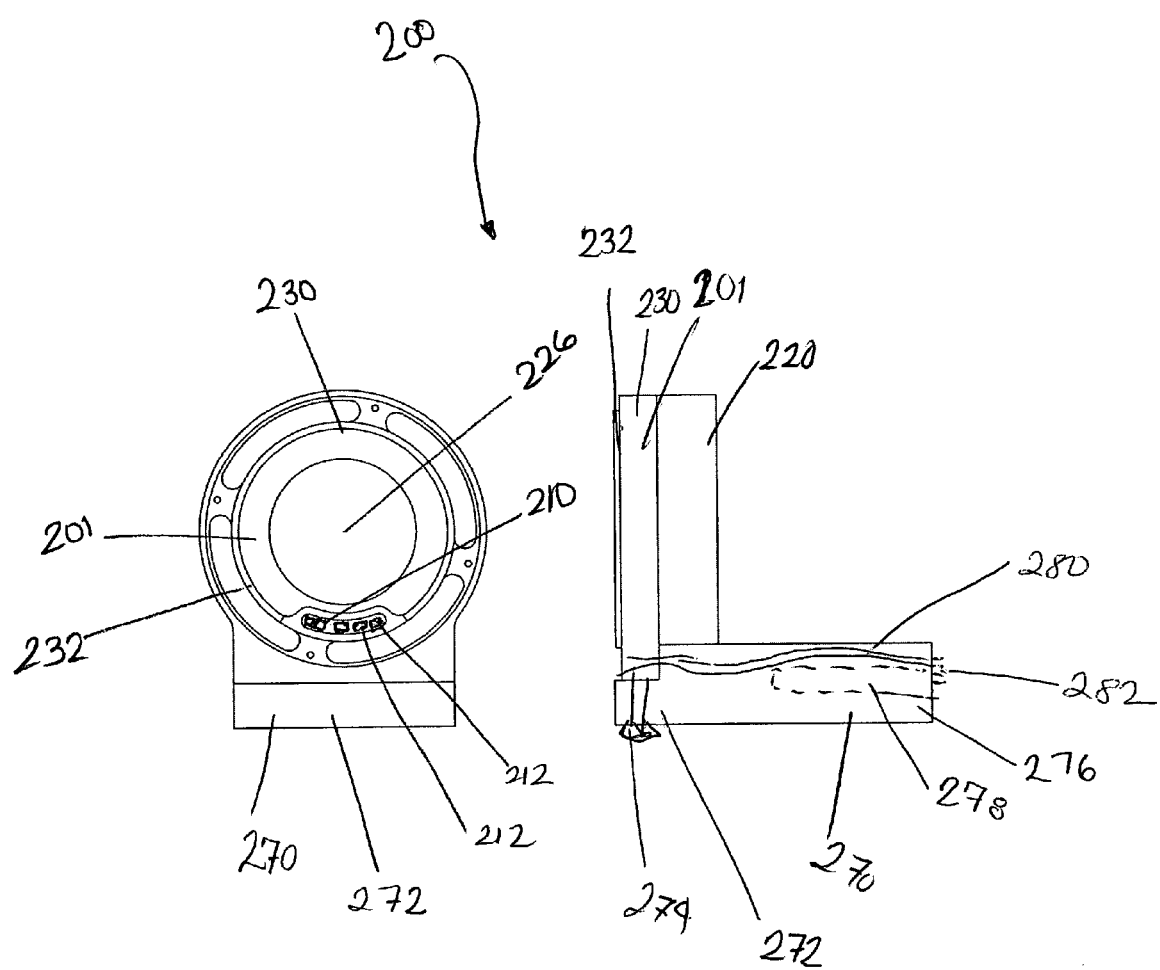
FIG. 9 illustrates outer and side views of the collar and attachment in the second adapter in the embodiment of the optical adapter system and method of FIG. 1.

The illustrated collar 201 is closed when attached to attachment member 270, but the collar 201 may also be open, or more of a casing or housing in other embodiments. Distal portion 230 is configured with an interface 232 to mechanically connect or couple second adapter 200 to the camera 31, and an electric connector 210 to electrically connect or couple second adapter 200 to camera 31. Electrical connector 210 may include metal interface 212, as illustrated, that are securely attached within collar 201. Interface 232 and electrical connector 210 may be similar or the same as the interface 13 (or match the manner in which interface 13) on lens 11 enables lens 11 to be directly mechanically and electrically connected or coupled with the camera 31. In the case of the camera 33 and lens 11 being standard off-the-shelf designs, interface 232 and electrical connector 210 may have a standard configuration to couple or connect a variety of cameras 31 with a variety of other image modifying devices 100 and 200 in optical adapter systems 1000. Interface 232 and electrical connector 210 as illustrated in FIGS. 9 and 12, interacts and matches with a twist and lock mechanism 32 and electrical connection 34 on camera 31, to releasably but securely mechanically and electrically connect or couple camera 31 with second adapter 200 as illustrated in FIG. 1.

Figure 8:
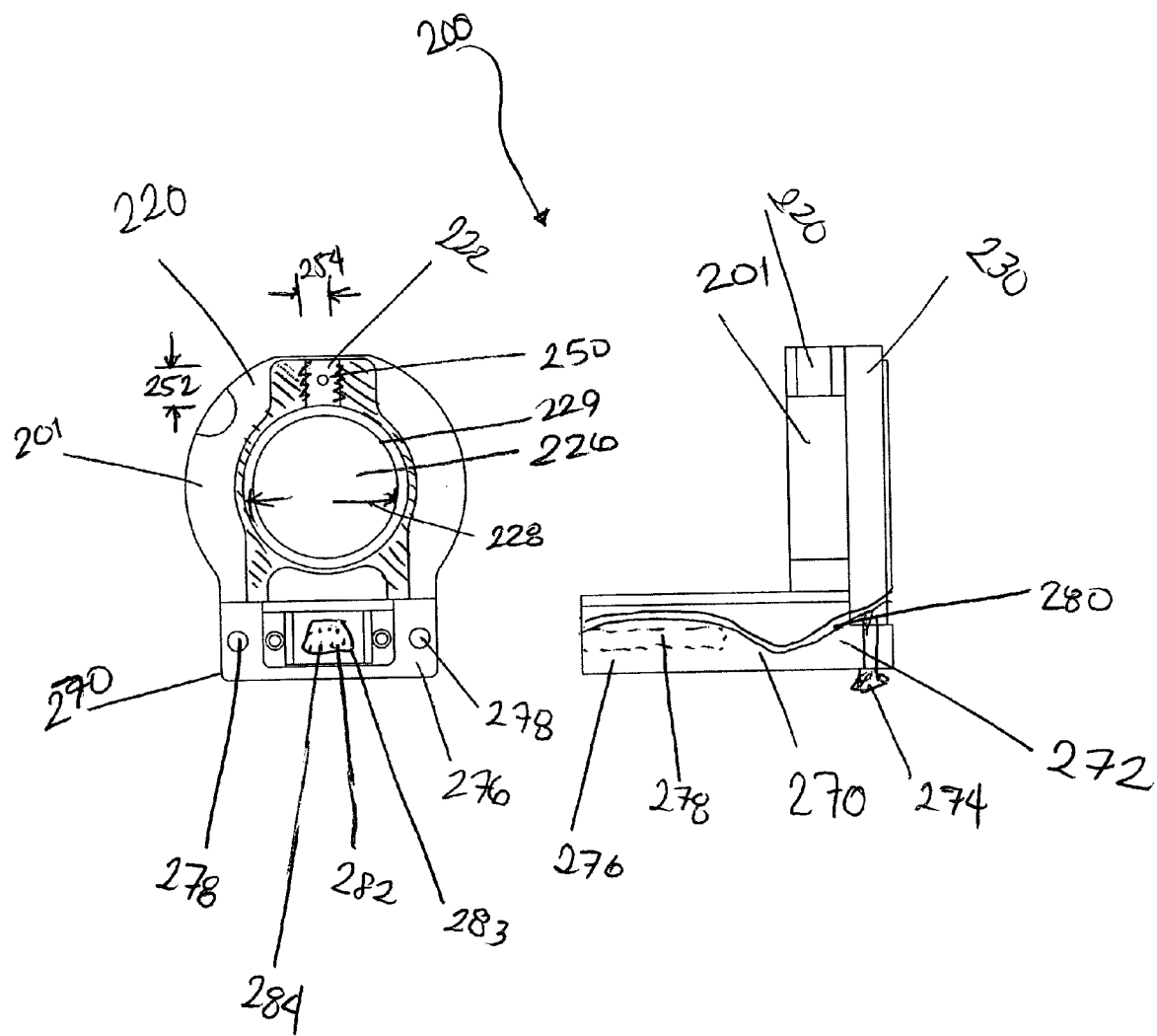
FIG. 8 illustrates a cross-sectional inner view and a side view of a collar and an attachment member in the second adapter in the embodiment of the optical adapter system and method of FIG. 1.

As illustrated in FIGS. 2, 8 and 12, the proximal portion 220 of the collar 201 is configured to receive the distal portion 24 of the night vision monocular 21. The proximal portion 220 includes a mechanism 222 to securely but releasably grip the proximal portion 220 of second adapter 200 with the distal portion 24 of the night vision monocular 21 (sometimes referred to as a "monoloc"). The gripping mechanism 222 an opening 250 through a surface or periphery 224 in the proximal portion 220 of collar 201, and a screw 260 configured to be threadably receivable therethrough. Opening 250 is at least partially threaded and runs through a cross section of surface or periphery 224 into an interior 226 of collar 201, as illustrated in FIG. 8. Screw 260 may have a ring or member, such as the d-ring 267 illustrated in FIG. 3 on top 264, to make it easier to manually rotate screw 260 in clockwise and counterclockwise directions. Additionally, d-ring 267 on second adapter 200, either alone or together with d-ring 167 on first adapter 100, allow adapter assembly 500 or the entire optical adapter assembly 1000 to be securely threaded and tied onto or around other gear or equipment (not shown), making the assembly 1000 or any portion thereof easier to carry around.

Screw 260 is longer than the length 252 of opening 250, and has a diameter 263 less than a diameter 254 of opening 250 to be threadably inserted therethrough. Screw 260 has a length 262 sufficient to extend through a length 252 of opening 250 to reduce inner diameter 228 of collar 201 when screw 260 is further inserted through opening 250. When further inserted through opening 250, bottom 266 of screw 260 pushes or presses distal portion 24 of night vision monocular 21 against proximal portion 220 of collar 201. In addition to bottom 266 of screw 260 acting upon and pressing upon proximal portion 220 of collar 201, the force of the screw 260 on the night vision monocular 21 presses or pushes an outer surface 35 of distal portion 24 of the night vision monocular 21 against inner surface 229 in proximal portion 220 of collar 201.

Essentially, in order to secure night vision monocular 21 in collar 201, the distal portion 24 of night vision monocular 21 is inserted into proximal portion 220 of collar 201, as illustrated in FIG. 12. Then, in order to secure the night vision monocular 21 in collar 201, gripping mechanism 232 is activated or engaged to releasably secure night vision monocular 21 in collar 201 by further screwing or inserting screw 260 through opening 250, until the bottom 266 pushes or presses down on distal portion 24 of night vision monocular 21. Night vision monocular 21 can be removed from collar 201 by unscrewing or removing screw 260 upwards through opening, until the bottom 266 clears inner surface 229 of collar 201. The night vision monocular 21 is then slid out or removed from collar 201.

As with the first adapter 100, as described above and as illustrated in FIGS. 4, 8, 9 and 12, second adapter 200 includes an attachment member 270 for releasably connecting or coupling second adapter 200 with first adapter 100. Attachment member 270 may be integrally formed with collar 201 or removably attached to collar 201 with screws 274 in distal portion 272 of attachment member 270. Attachment member 270 includes two means for connecting second adapter 200 to first adapter 100, one mechanical and one that is both electrical and mechanical. First, attachment member 270 includes cavities 278 in proximal end 276 configured to slidably receive dowels 178 in distal end 176 of attachment member 170 of first adapter 100. Attachment member 270 has male connector 282 at proximal end 276, illustrated in FIG. 8, that interfaces and connects with female connector 182 in distal end 176 of attachment member 170 of first adapter 100, illustrated in FIG. 5. As illustrated, the male connector 282 includes pins 283 which are surrounded and protected by a casing or housing 284, which limit exposure of delicate wiring and circuitry to outside elements and harsh climate conditions. Attachment member 270 further includes circuitry 280 therein that is connected with male connector 282, and attachment member 170 includes circuitry 180 therein that is connected with female connector 182. As described above, electrical circuitry 180, 280 and female and male connectors 182 and 282, allow lens 11 to be electrically connected to camera 31 through adapter assembly 500, when fully assembled, while electrically isolating the night vision monocular 21 from both lens 11 and camera 31. The mechanical and electrical configurations mechanically and electrically connecting first adapter 100 with second adapter 200 are interchangeable between adapters 100 and 200.

The usage of dowels and electrical connectors to couple and connect two hardened plastic attachment members 170 and 270 enable the optical assembly 500 to maintain proper focal length between first, second and third image modifying devices 100, 200 and 300 each time when it is assembled. No external tools are necessary to couple and connect or release all of the parts in the optical adapter assembly 1000 together. Further, since most of the electrical circuitry 180, 280 are contained within attachment members 170, 270, the electrical components exposed to outside elements in adapter assembly 500 are limited to electrical connectors 182, 282 and electric connectors 110 and 210 included in proximal portion 120 of collar 101 and distal portion 230 of collar 201.

The first and third image modifying devices 10 and 30 may be attached at any time to adapter assembly 500. Although other configurations are possible, the second image modifying device 20 is inserted and secured into one of the first adapter 100 and second adapter 200 before the one of the first adapter 100 and second adapter 200 is coupled or connected to the other of the first adapter 100 and second adapter 200, with its respective channels 140 and 142 and locking mechanism 132, or with its respective gripping mechanism 222, as illustrated in FIG. 12. First and second adapters 100 and 200 may be coupled or connected at the same time that the second image modifying device 20 is inserted and secured into the other of the first adapter 100 and second adapter 200 as described above.

As mentioned above, there are different combinations of the above-described optical adapter system and method for releasably but securely connecting or coupling the first adapter 100 and second adapter 200 with each other and with the image modifying devices 10, 20 and 30. First, either adapter may function alone, attaching two otherwise incompatible image modifying devices.

Figure 16:
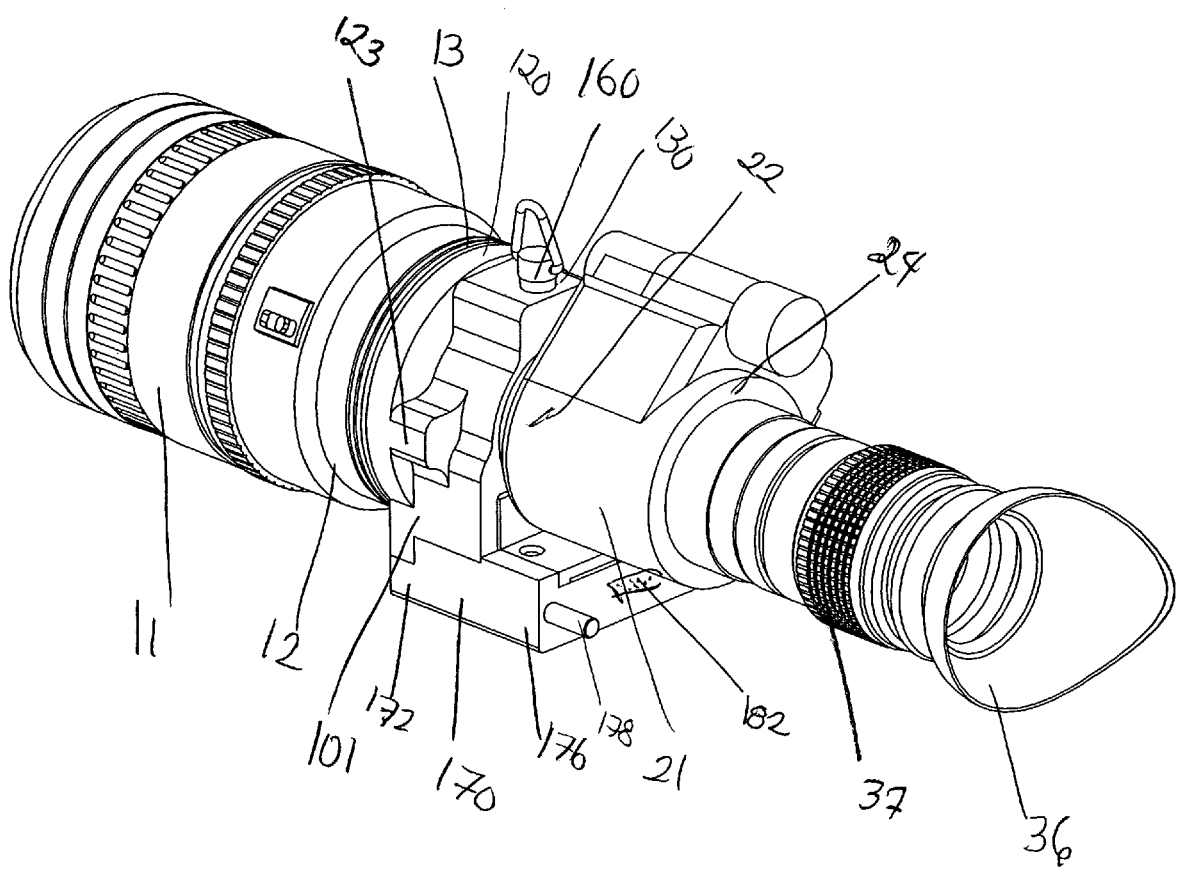
FIG. 16 illustrates a perspective view of an assembly of a night vision monocular, with a casing-lens assembly and eyepiece in an embodiment of an optical adapter system and method according to the present invention.

For example, first adapter 100 may be used alone to couple a first image modifying device 10 to a second image modifying device 20 that otherwise may be incompatible with each other. As illustrated in FIG. 16, first adapter 100 may be used to couple a lens 11 with a night vision monocular 21. Casing-lens assembly 37 is unscrewed from proximal portion 22 of night vision monocular 21, and eyepiece 36 is screwed onto proximal portion 22 of night vision monocular 21 in its place. Distal potion 24 of monocular 21 is then inserted into proximal portion 120 of collar 101, and lens 11 is connected to distal portion 130 of collar 101. The assembly of the monocular 21 with collar 101 and lens 11 provides expanded zooming capability to monocular 21. Then, the same assembly can be readily adapted for photo surveillance by replacing eyepiece 36 with casing-lens assembly 37, inserting and securing distal portion 24 of monocular 21 to proximal portion 220 of collar 201, and connecting or coupling camera 31 to distal portion 230 of collar 201 to form assembly 1000 illustrated in FIGS. 1 and 12 through 15.

Figure 17:
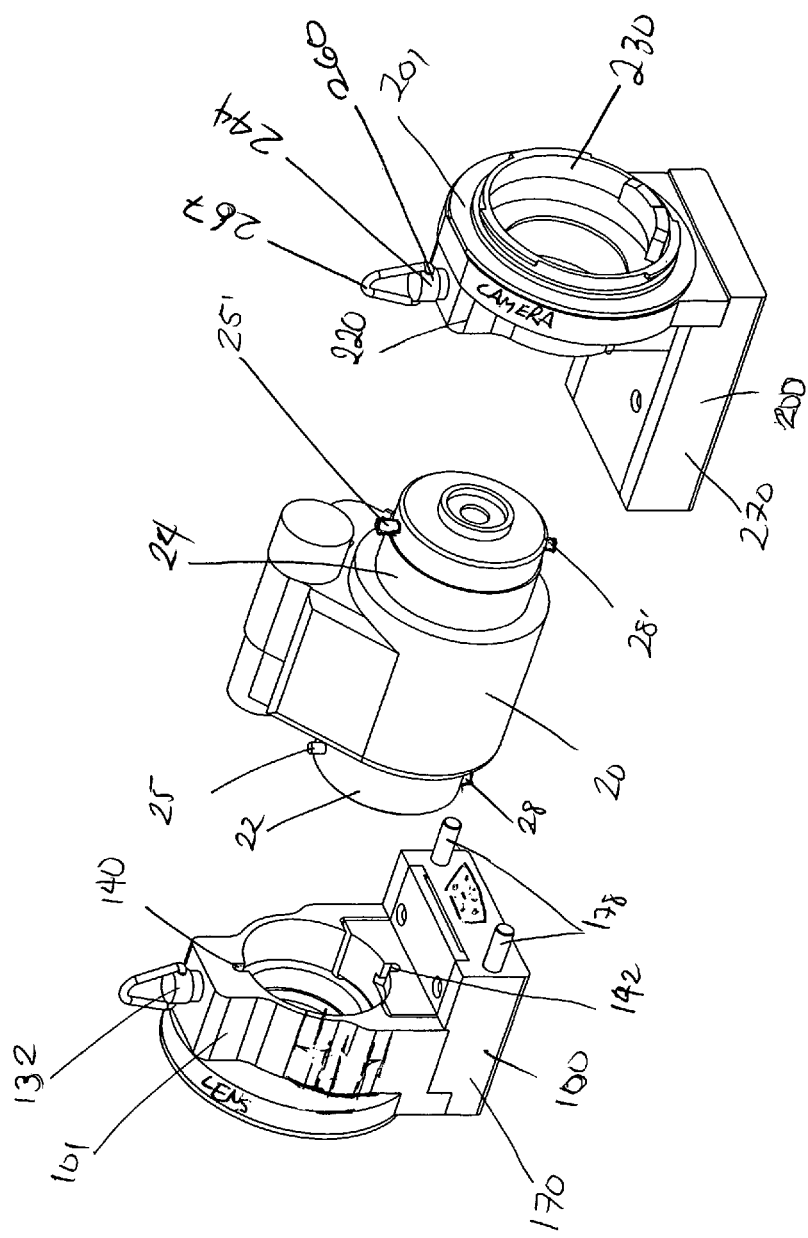
FIG. 17 illustrates a perspective view of a first adapter, a second image modifying device, and a second adapter in an embodiment of an optical adapter system and method according to the present invention.
Figure 18:
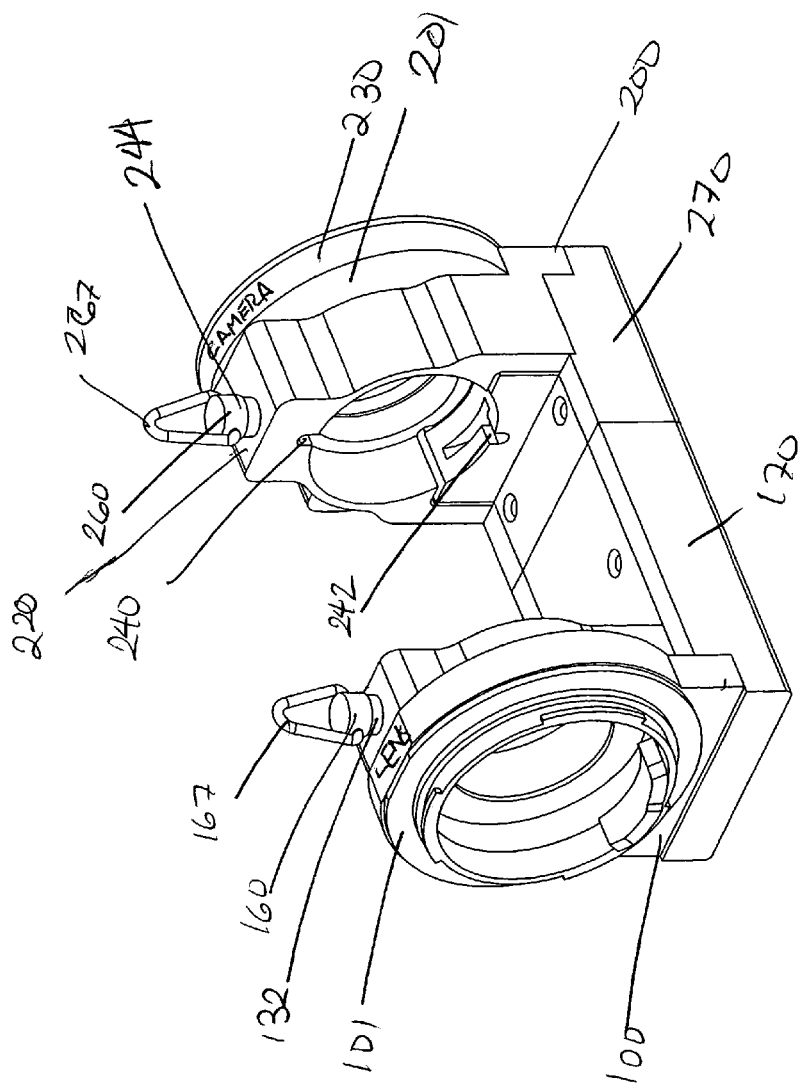
FIG. 18 illustrates a perspective view of the first adapter and second adapter in the embodiment of the optical adapter system and method of FIG. 17.

In an embodiment, the mechanisms and members used or involved in releasably but securely coupling or connecting the proximal portion 22 of second image modifying device 20 to the first adapter 100 may also be used to couple or connect the distal portion 24 of second image modifying device 200 to the second adapter 200, in place of or in addition to gripping mechanism 222. As illustrated in FIGS. 17 and 18, second image modifying device 20 may include mating members 25' and 28' to be inserted into channels 240 and 242 in collar 201, when second adapter 200 is slid onto distal portion 24 of second image modifying device 20. A locking mechanism 244 similar to the locking mechanism 132 on first adapter 100, may be used to releasably but securely couple or connect second adapter 200 to second image modifying device 20. Then, second image modifying device 20 has mating members on both proximal portion 22 and distal portion 24, and is coupled or connected to both first adapter 100 and second adapter 200 in the same or similar manner.

Figure 19:
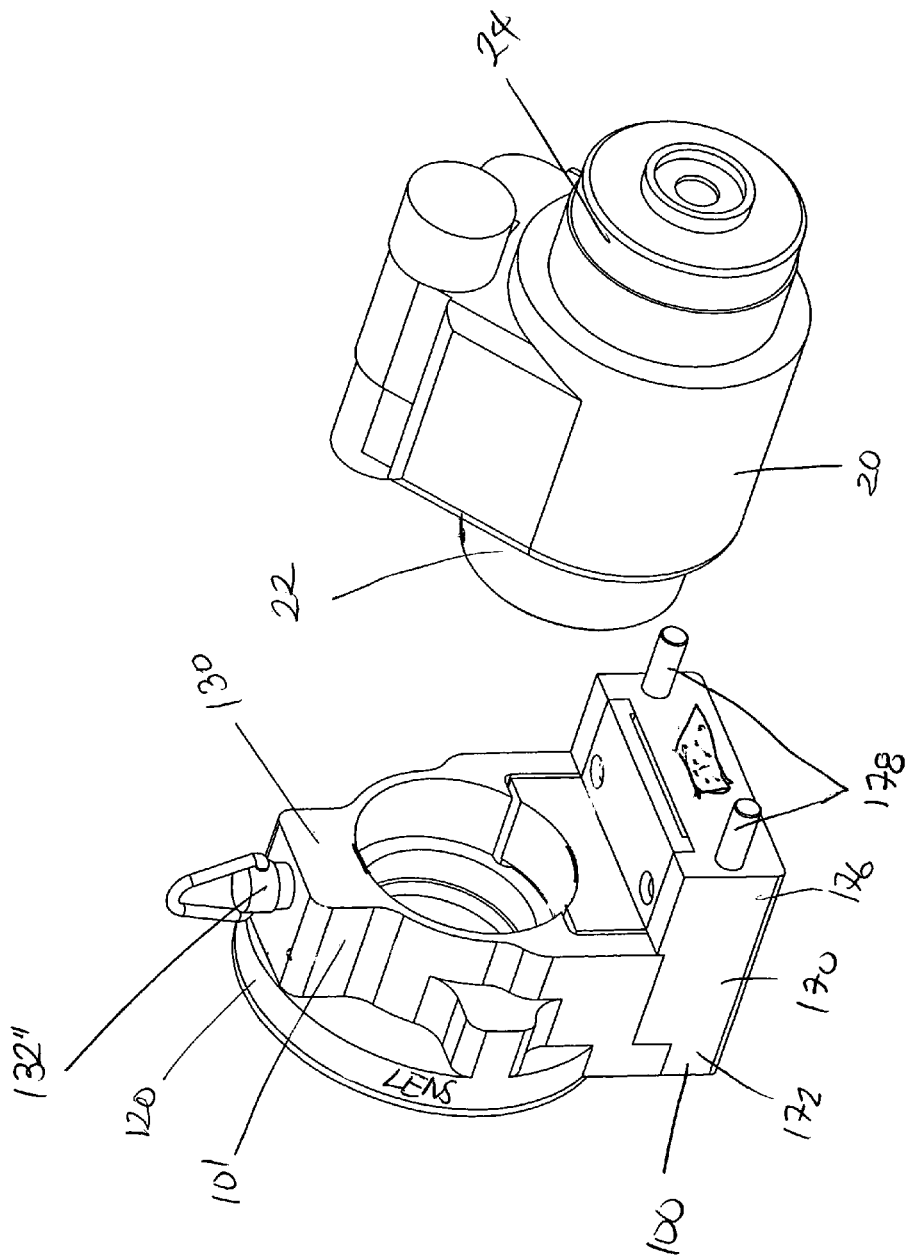
FIG. 19 illustrates a perspective view of a first adapter and a second image modifying device in an embodiment of an optical adapter system and method according to the present invention.
Figure 20:
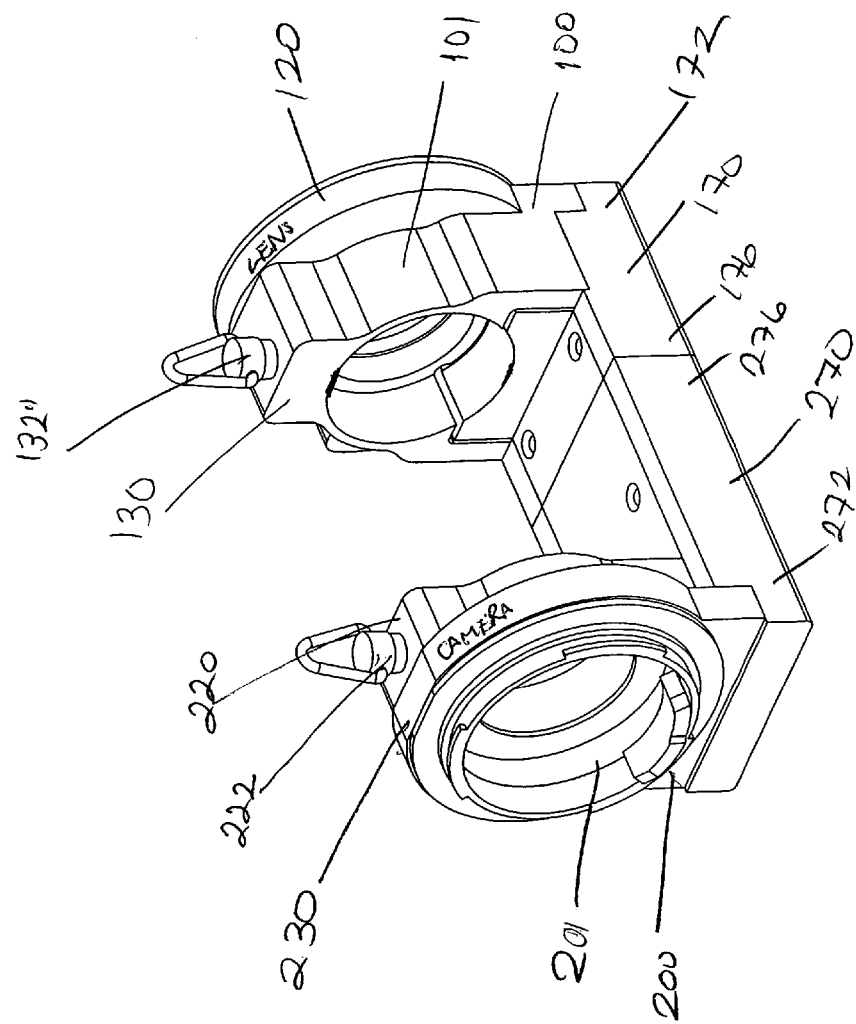
FIG. 20 illustrates a perspective view of the first adapter and a second adapter in the embodiment of the optical adapter system and method of FIG. 19.

The reverse may also be employed in accordance with the present invention. In an embodiment, the gripping mechanism 222 used to releasably but securely couple or connect second adapter 200 to second image modifying device 20 may be used on first adapter 100 to securely or releasably couple or connect first adapter 100 to second image modifying device 20, in place of or in addition to the existing mechanisms and members used for such connection or coupling. As illustrated in FIGS. 19 and 20, proximal portion 22 of second image modifying device 20 may be inserted into distal portion 130 of collar 101, and gripping mechanism 132" similar to gripping mechanism 222 may be used to releasably but securely couple or connect first adapter 100 to second image modifying device 20. Then, second image modifying device 20 is coupled or connected to both first adapter 100 and second adapter 200 in the same or similar gripping manner, as described above with respect to second adapter 200.

In the preceding specification, the present invention has been described with reference to specific exemplary embodiments thereof. It will, however, be evident that various modifications and changes may be made thereunto without departing from the broader spirit and scope of the present invention as set forth in the claims that follow. The specification and drawings are accordingly to be regarded in an illustrative rather than restrictive sense.

What is claimed is:

1. An adapter system comprising:
   a first adapter configured to couple a first image modifying device with a second image modifying device, a proximal portion of the first adapter configured to be connected to the first image modifying device, a distal portion of the first adapter configured to be connected to the second image modifying device,
   wherein
      the distal portion includes a first channel and a locking mechanism, the first channel configured to receive a first mating member on the second image modifying device,
      the first adapter is arranged to connect to the second image modifying device by insertion of a proximal portion of the second image modifying device into the adapter in an insertion direction and rotation of the second image modifying device about an axis corresponding to the insertion direction, the rotation of the second image modifying device causing the first mating member to travel along a portion of the first channel that is perpendicular to the axis of the rotation,
      the second image modifying device is maintained in a fixed axial position with respect to the first adapter due to radial extension of the first mating member beyond a periphery of the proximal portion of the second image modifying device and into the perpendicular portion of the channel such that the first mating member is axially constrained by a distal wall of the perpendicular portion of the first channel, and
      the locking mechanism is selectively engageable to releasably secure a position of the first mating member in the perpendicular portion of the first channel.

2. The adapter system according to claim 1, wherein at least one of the first image modifying device and the second image modifying device are at least one of a camera, a lens, an optical viewing piece, and a night-vision monocular.

3. The adapter system according to claim 1, wherein at least a portion of the adapter system is made of a hardened plastic substance.

4. The adapter system according to claim 3, wherein the hardened plastic substance is a type of an acetal homopolymer.

5. The adapter system according to claim 1, wherein the locking mechanism releasably secures the position of the first mating member in the first channel by restricting a movement of the first mating member in the first channel.

6. The adapter system according to claim 1, wherein the locking mechanism includes a blocking member configured to selectively obstruct at least a portion of the first channel.

7. The adapter system according to claim 1, wherein the locking mechanism includes a threaded opening through a surface in the distal portion into an interior of the first channel and a screw having a length sufficient to extend through a length of the opening into the first channel and to at least partially block a portion of the first channel when the screw is further inserted through the opening.

8. The adapter system according to claim 7, wherein an upper portion of the screw includes at least one of a ring therethrough and a member hingedly fixed thereon, the at least one of the ring and the member having a width sufficient to facilitate manual rotation of the screw.

9. The adapter system according to claim 1, further comprising the first image modifying device connected to the proximal portion of the first adapter.

10. The adapter system according to claim 9, further comprising the second image modifying device securely connected to the distal portion of the first adapter by sliding the first mating member of the second image modifying device along the first channel and engaging the locking mechanism.

11. The adapter system according to claim 10, wherein the first adapter includes a collar, a distal portion of the collar configured to receive a proximal portion of the second image modifying device therein.

12. The adapter system according to claim 11, wherein the first mating member of the second image modifying device is one of a post and a pin on an outer surface of the second image modifying device, the one of the post and the pin having a diameter less than a width of the first channel.

13. The adapter system according to claim 11, wherein a first portion of the first channel is parallel to a direction of insertion of the second image modifying device into the collar.

14. The adapter system according to claim 13, wherein a second portion of the first channel is parallel to a direction of rotation of the second image modifying device in the collar.

15. The adapter system according to claim 11, wherein a first portion of the first channel is parallel to a longitudinal axis of the collar, and a second portion of the first channel is perpendicular to the first portion of the first channel.

16. The adapter system according to claim 1, wherein the distal portion of the first adapter further includes a second channel, the second channel configured to receive a second mating member of the second image modifying device.

17. The adapter system according to claim 16, wherein a first portion of each of the first channel and the second channel are parallel to a longitudinal axis of the first adapter, and a second portion of each of the first and second channels are perpendicular to the first portions of the first and second channels.

18. The adapter system according to claim 17, wherein the second channel is opposite the first channel.

19. The adapter system according to claim 18, further comprising the second image modifying device, the second image modifying device including the first and second mating members, the second mating member being opposite the first mating member.

20. The adapter system according to claim 19, wherein the first adapter includes a collar, the distal portion of the collar including the first and second channels in an interior surface of the collar, the first and second mating members of the second image modifying device sliding through the first portion of the first and second channels when a proximal portion of the second image modifying device is inserted into the distal portion of the collar.

21. The adapter system according to claim 20, wherein the first and second mating members are moved through the second portions of the first and second channels when the second image modifying device is rotated in the collar after the proximal portion of the second image modifying device is inserted into the distal portion of the collar.

22. The adapter system according to claim 1, further comprising a second adapter releasably connectable to the first adapter, the second adapter being configured to couple the second image modifying device to a third image modifying device.

23. The adapter system according to claim 22, wherein one of the first and second adapters includes at least one dowel releasably mateable with a respective cavity in another of the first and second adapters.

24. The adapter system according to claim 22, wherein one of the first and second adapters includes a male connector, and another of the first and second adapters includes a female connector, the male connector being configured to be releasably mateable with the female connector to electrically connect the first image modifying device to the third image modifying device.

25. The adapter system according to claim 22, wherein the first and second adapters further include electric circuitry configured to electrically connect the first and third image modifying devices while electrically isolating the second image modifying device when the first and second adapters are assembled with the first, second and third image modifying devices.

26. The adapter system according to claim 22, wherein a distal portion of the second adapter is configured to be connected to the third image modifying device, and a proximal portion of the second adapter is configured to be connected to the second image modifying device, and wherein the proximal portion includes at least one channel and a locking mechanism, each of the at least one channel being configured to receive a mating member on an outer surface of the second image modifying device, and the locking mechanism selectively engageable to releasably secure a position of the mating member in one of the at least one channels.

27. The adapter system according to claim 22, wherein a distal portion of the second adapter is configured to be connected to the third image modifying device, and a proximal portion of the second adapter is configured to be connected to the second image modifying device, and wherein the proximal portion includes a collar configured to receive a distal portion of the second image modifying device, the collar including a mechanism to releasably grip the distal portion of the second image modifying device in the collar.

28. The adapter system according to claim 27, wherein the releasably gripping mechanism includes a threaded opening through a surface in the collar and a screw having a length sufficient to extend through a length of the opening and to reduce a diameter of the collar when the screw is further inserted through the opening.

29. The adapter system according to claim 27, wherein the releasably gripping mechanism includes a threaded opening through a surface in the collar and a screw having a length sufficient to extend through a length of the opening and to press on an outer surface of the distal portion of the second image modifying device when the screw is further inserted through the opening.

30. The adapter system according to claim 22, further comprising:
the first image modifying device connected to the proximal portion of the first adapter;
the second image modifying device, the proximal portion of the second image modifying device being connected to the distal portion of the first adapter; and
the third image modifying device connected to the distal portion of the second adapter, the second adapter being connected to the first adapter, the distal portion of the second image modifying device being connected to the proximal portion of the first adapter.

31. The adapter system according to claim 30, wherein the proximal portion of the first adapter includes a coupling mechanism similar to the mechanism on the proximal portion of the third image modifying device, the mechanism on the proximal portion of the third image modifying device configured to directly couple the third image modifying with the first image modifying device.

32. The adapter system according to claim 30, wherein the distal portion of the second adapter includes a coupling mechanism similar to the mechanism on the distal portion of the first image modifying device, the mechanism on the distal portion of the first image modifying device configured to directly couple the first image modifying device directly to the third image modifying device.

33. An adapter system comprising:
a first adapter configured to couple a first image modifying device with a second image modifying device, a distal portion of the first adapter configured to be connected to the first image modifying device, a proximal portion of the first adapter configured to be connected to the second image modifying device,
wherein the proximal portion includes a locking mechanism, the locking mechanism including a threaded opening through a periphery of the proximal portion and a screw having a length sufficient to extend through a length of the opening and to push an outer surface of a distal portion of the second image modifying device against an inner surface of the proximal portion of the first adapter when the screw is further inserted through the opening; and
a second adapter configured to couple the second image modifying device with a third image modifying device, a proximal portion of the second adapter configured to be connected to the third image modifying device, a distal portion of the second adapter configured to be connected to a proximal portion of the second image modifying device, wherein:

the distal portion of the second adapter includes a first channel and a second locking mechanism, the first channel configured to receive a first mating member on the second image modifying device, the second adapter is arranged to connect to the second image modifying device by insertion of the proximal portion of the second image modifying device into the second adapter in an insertion direction and rotation of the second image modifying device about an axis corresponding to the insertion direction, the rotation of the second image modifying device causing the first mating member to travel along a portion of the first channel that is perpendicular to the axis of the rotation, the second image modifying device is maintained in a fixed axial position with respect to the second adapter due to radial extension of the first mating member beyond a periphery of the proximal portion of the second image modifying device and into the perpendicular portion of the channel such that the first mating member is axially constrained by a distal wall of the perpendicular portion of the first channel, and the second locking mechanism is selectively engageable to releasably secure a position of the first mating member in the perpendicular portion of the first channel.

34. The adapter system according to claim 33, wherein the second adapter is releasably connectable to the first adapter.

35. The adapter system according to claim 34, wherein one of the first and second adapters includes at least one dowel releasably mateable with a respective cavity in another of the first and second adapters.

36. The adapter system according to claim 34, wherein one of the first and second adapters includes a male connector, and another of the first and second adapters includes a female connector, the male connector being configured to be releasably mateable with the female connector to electrically connect the first image modifying device to the third image modifying device.

37. The adapter system according to claim 34, wherein the first and second adapters further include electric circuitry configured to electrically connect the first and third image modifying devices while electrically isolating the second image modifying device when the first and second adapters are assembled with the first, second and third image modifying devices.

38. The adapter system according to claim 34, further comprising:
the first image modifying device connected to the distal portion of the first adapter;
the second image modifying device, the distal portion of the second image modifying device being connected to the proximal portion of the first adapter; and
the third image modifying device connected to the proximal portion of the second adapter, the second adapter being connected to the first adapter, the proximal portion of the second image modifying device being connected to the distal portion of the first adapter.

39. A method comprising the steps of:
connecting a first image modifying device to a proximal portion of a first adapter;
inserting, in an insertion direction, a radially-projecting first mating member on a proximal portion of a second image modifying device into a first channel in a distal portion of the first adapter;
after the inserting step, rotating the first image modifying device with respect to the first adapter such that the first mating member slides along a portion of the first channel that is perpendicular to the insertion direction; and
after the rotating step, securing a position of the first mating member in the portion of the first channel that is perpendicular to the insertion direction.

40. The method according to claim 39, wherein the securing step includes the substep of:
restricting a movement of the first mating member in the first channel.

41. The method according to claim 40, wherein the movement restricting step includes the substep of:
inserting a portion of the locking mechanism into the first channel.

42. The method according to claim 39, wherein the securing step includes the substep of:
engaging a locking mechanism to secure the position of the first mating member in the first channel.

43. The method according to claim 42, wherein the engaging step includes the substep of:
obstructing a movement of the first mating member out of the first channel.

44. The method according to claim 43, wherein the engaging step includes the substep of:
before the obstructing substep, turning a screw into an opening through a periphery of the distal portion of the first adapter until a lower portion of the screw emerges into an interior of the channel.

45. The method according to claim 44, wherein the engaging step includes the substep of:
before the screw turning substep, rotating the second image modifying device within the distal portion of the first adapter to move the first mating member through a circumferential portion of the channel.

46. The method according to claim 39, further comprising the steps of:
connecting a distal portion of the second image modifying device to a proximal portion of a second adapter; and
connecting the first adapter to the second adapter.

47. The method according to claim 46, further comprising the step of:
connecting a distal portion of the second adapter to a third image modifying device.

48. The method according to claim 46, wherein the step of connecting the first adapter to the second adapter includes the substep of:
inserting at least one dowel on one of the first and second adapters into at least one cavity in another of the first and second adapters.

49. The method according to claim 46, wherein the step of connecting the first adapter to the second adapter includes the substep of:
inserting a male electrical connector on one of the first and second adapters into a female electrical connector on another of the first and second adapters.

50. The method according to claim 46, further comprising the step of:
connecting a third image modifying device to a distal portion of the second adapter.

51. The method according to claim 50, wherein the step of connecting the first adapter to the second adapter includes the substep of:
coupling circuitry in the first adapter and second adapter to electrically connect the first image modifying device to the third image modifying device.

52. The method according to claim 46, wherein the step of connecting the distal portion of the second image modifying device to the proximal portion of the second adapter includes the substeps of:

inserting a first mating member on a distal portion of the second image modifying device into a first channel in the proximal portions of the second adapter; and after the inserting step, securing a position of the first mating member in the distal portion of the second image modifying device in the first channel in the proximal portion of the second adapter.

53. The method according to claim 46, wherein the step of connecting the distal portion of the second image modifying device to the proximal portion of the second adapter includes the substep of:

securing an outer surface of the distal portion of the second image modifying device to an inner surface of the proximal portion of the second adapter.

54. The method according to claim 53, wherein the securing step includes the substep of:

rotating a screw through an opening through a periphery of the proximal portion of the second adapter until a lower end of the screw is pressing against an upper portion of the outer surface of the distal portion of the second image modifying device.

55. A method comprising the steps of:

connecting a first image modifying device to a distal portion of a first adapter; and rotating a screw through an opening through a periphery of a proximal portion of the first adapter until a lower end of the screw is pressing against an upper portion of the outer surface of the distal portion of a second image modifying device;

inserting, in an insertion direction, a radially-projecting first mating member on a proximal portion of the second image modifying device into a first channel in a distal portion of a second adapter;

after the inserting step, rotating the second image modifying device with respect to the second adapter such that the mating member slides along a portion of the first channel that is perpendicular to the insertion direction; and after the step of rotating the second image modifying device, securing a position of the first mating member in the portion of the first channel that is perpendicular to the insertion direction.

56. The method according to claim 55, further comprising the step of:

before the step of rotating the screw, inserting the distal portion of the second image modifying device into the proximal portion of the first adapter.

57. The method according to claim 55, further comprising the step of:

connecting the first adapter to the second adapter.

58. The method according to claim 57, further comprising the step of:

connecting a third image modifying device to a proximal portion of the second adapter.

59. An adapter system comprising:

a first image modifying device which includes at least one of (a) a camera, (b) a lens, and (c) an optical viewing piece;

a night vision monocular having a radial projection, a first adapter arranged to releasably couple the first image modifying device to the night vision monocular, the first adapter including a channel arranged to receive the radial projection of the night vision monocular such that the radial projection travels within the channel when the night vision monocular is rotated about its axis with respect to the first adapter, a first portion of the channel being parallel to the axis of the monocular and a second portion of the channel being perpendicular to the axis of the monocular such that the night vision monocular is held in a fixed axial position when the radial projection travels within the perpendicular second portion of the channel, wherein the night vision monocular is releasable from the fixed axial position when rotated about its axis to a position at the first portion of the channel where the radial projection clears a sidewall of the perpendicular second portion of the channel, and a locking mechanism arranged to selectably move into a path of the radial projection along the perpendicular second portion of the channel, thereby constraining the radial projection in the perpendicular second portion of the channel; and a second adapter releasably connectable to the first adapter, the second adapter being configured to couple the night vision monocular to a second image modifying device.

60. The device according to claim 59, wherein the locking mechanism extends radially inwardly into the channel.

* * * * *